US012685266B2

(12) United States Patent
Beutel et al.

(10) Patent No.: US 12,685,266 B2
(45) Date of Patent: Jul. 21, 2026

(54) ARRANGEMENT OF EQUIPMENT, WORKING VEHICLE AND METHOD IN PARTICULAR FOR MAINTAINING GREEN AREAS, MOWING, SOIL TILLAGE, OR HARVESTING RAW OR CEREAL CROPS

(71) Applicant: Fischer Maschinenbau GmbH & Co. KG, Gemmrigheim (DE)

(72) Inventors: Reiner Beutel, Ludwigsburg (DE); Dieter Reber, Gemmrigheim (DE)

(73) Assignee: Fischer Maschinenbau GmbH & Co. KG, Gemmrigheim (DE)

( * ) Notice: Subject to any disclaimer, the term of this patent is extended or adjusted under 35 U.S.C. 154(b) by 1040 days.

(21) Appl. No.: 17/737,798

(22) Filed: May 5, 2022

(65) Prior Publication Data

US 2022/0256771 A1 Aug. 18, 2022

Related U.S. Application Data

(63) Continuation of application No. PCT/EP2020/081388, filed on Nov. 6, 2020.

(30) Foreign Application Priority Data

Nov. 9, 2019 (DE) ..................... 10 2019 130 271.4

(51) Int. Cl.
*A01D 75/20* (2006.01)
*A01B 49/04* (2006.01)
*A01D 43/00* (2006.01)

(52) U.S. Cl.
CPC .............. *A01D 75/20* (2013.01); *A01B 49/04* (2013.01); *A01D 43/00* (2013.01)

(58) Field of Classification Search
CPC ...... A01D 75/20; A01D 43/00; A01D 34/001; A01D 34/826; A01D 75/18; A01B 49/04
See application file for complete search history.

(56) References Cited

U.S. PATENT DOCUMENTS 6,202,394 B1 * 3/2001 Russ .................... A01D 34/001
180/84
7,997,964 B2 * 8/2011 Gehring ................. B60H 1/345
454/155

(Continued)

FOREIGN PATENT DOCUMENTS

DE 19541713 A1 * 5/1997 ............. A01D 75/20
DE 20 2015 006 431 U1 10/2015
EP 0739581 A1 * 10/1996 ............. A01D 34/50

OTHER PUBLICATIONS

Leaf Blower MPH from Home Depot https://www.homedepot.com/b/Outdoors-Outdoor-Power-Equipment-Leaf-Blowers/High/N-5yc1vZbxavZ1z1t0ns (Year: 2025).*

(Continued)

*Primary Examiner* — Joseph M Rocca
*Assistant Examiner* — Douglas J Meislahn
(74) *Attorney, Agent, or Firm* — Bose McKinney & Evans LLP

(57) ABSTRACT

This disclosure relates to an arrangement of equipment with an implement which has a machine tool for a working operation selected from the group comprising maintenance of green areas, mulching, mowing, soil tillage, harvesting coarse fodder, harvesting cereal crops and spraying, and which has an active portion which can be moved in a working direction through a working region. The arrangement of equipment includes a blower for blowing small creatures out of a portion of the working region preceding the active portion of the machine tool in the working direction.

3 Claims, 30 Drawing Sheets

(56) References Cited

U.S. PATENT DOCUMENTS

| | | | |
|---|---|---|---|
| 8,579,058 B1 | 11/2013 | Yamada et al. | |
| 2014/0318098 A1 * | 10/2014 | Fay, II | A01D 34/001 |
| | | | 56/229 |
| 2015/0096277 A1 | 4/2015 | Muffie | |
| 2015/0223398 A1 * | 8/2015 | Nelson | A01D 34/866 |
| | | | 56/15.2 |
| 2016/0014953 A1 | 1/2016 | Tillman et al. | |
| 2018/0339587 A1 * | 11/2018 | Dimmling | B60K 17/28 |
| 2019/0041305 A1 * | 2/2019 | Bowers, II | G01N 1/02 |
| 2020/0296893 A1 * | 9/2020 | Bohrer | A01G 20/47 |

OTHER PUBLICATIONS

Jerry Stoddard, "Umount Z Turn Commercial Blower Front Mount" (https://www.youtube.com/watch?v=43WxMjJRLUw), Nov. 26, 2018 (Year: 2018).*
Billy Goat, "Billy Goat FZ Quick Attach Blower" (https://www.youtube.com/watch?v=-Ox9CUviOqs), Jun. 7, 2013 (Year: 2013).*
International Preliminary Report on Patentability, PCT/EP2020/081388, Feb. 11, 2022, 8 pages.
English translation of the International Search Report, PCT/EP2020/081388, Feb. 1, 2021, 2 pages.

* cited by examiner

ARRANGEMENT OF EQUIPMENT, WORKING VEHICLE AND METHOD IN PARTICULAR FOR MAINTAINING GREEN AREAS, MOWING, SOIL TILLAGE, OR HARVESTING RAW OR CEREAL CROPS

RELATED APPLICATIONS

This application is a continuation of PCT/EP2020/081388, filed Nov. 6, 2020, which claims priority to DE 10 2019 130 271.4, filed Nov. 9, 2019, both of which are hereby incorporated herein by reference.

BACKGROUND

This disclosure teaches an arrangement of equipment with an implement which has a machine tool for a working operation selected from the group comprising maintenance of green areas, mulching, mowing, soil tillage, harvesting coarse fodder, harvesting cereal crops, and which has an active portion which can be moved in a working direction through a working region. The arrangement of equipment contains a blower for providing blower air in a portion of the working region preceding the active portion of the machine tool in the working direction.

In addition, this disclosure relates to a working vehicle having such an arrangement of equipment and a method for carrying out a working operation selected from the group comprising maintenance of green areas, mowing, mulching, soil tillage, harvesting coarse fodder, harvesting cereal crops, spraying, in which a machine tool, which has an active portion, is moved in a working direction through a working region.

For maintenance of green areas, mulching, mowing, soil tillage, harvesting coarse fodder, harvesting cereal crops, implements are used in agriculture, in viticulture and fruit growing or in the professional, municipal and also in the private maintenance of green areas, which are in particular accommodated on vehicles and contain a machine tool device with a driven machine tool which cuts off and/or shreds plants or plant parts or which shreds plants and plant residues and incorporates said plants into the soil.

In order to enable precise and at the same time efficient processing of large surfaces during maintenance of green areas and soil tillage but also during harvesting or spraying, there is the need to move implements in a working direction through a working region and operate machine tools in the machine tool devices, e.g., tine rotors, blade carriers with blade tools, rotor shafts with tools mounted thereon for shredding green waste and/or cut wood and/or straw and corn stalks with high movement rates and/or high numbers of revolutions.

High movement rates and/or high numbers of revolutions of machine tools that are moved over large surfaces in a short time during maintenance of green areas, mulching, mowing, soil tillage, harvesting coarse fodder, harvesting cereal crops but also during spraying can result in harming significant amounts of small creatures, e.g., insects, in particular butterflies and bees, but also spiders and small mammals or birds.

The use of scraper rakes and scraper combs is known to protect small creatures from machine tools during maintenance of green areas, in particular during mowing, which are not only difficult to clean but are also extremely susceptible to repairs. However, such scraper rakes and scraper combs do not provide satisfactory protection for many small creatures. Mowing with double cutter bars, which do not shred the mowing material and are also less effective, in particular when compared to rotary mowers or mulchers, protects certain small creatures that are not located close to the soil. However, double cutter bars can also harm small creatures if they come into contact with the double cutter bar.

U.S. Publication No. 2015/0096277 A1 describes a lawnmower with a sickle mower that has one or two cutting blades rotating in a working plane. The lawn mower has a blower that contains a fan which is connected to a funnel-shaped blower air channel having an outlet opening for blower air. In this case, the blower is used to generate blower air which is guided through the outlet opening in front of the sickle mower with a flow direction running obliquely from top to bottom in relation to a working plane of the sickle mower, wherein this flow direction lies in a plane perpendicular to the working plane. By means of the blower air, stalks and twigs of the green waste arranged in front of the sickle mower can be set in motion such that small animals and bees are prompted to automatically move out of the portion of the working region of the lawn mower preceding the active portion of the sickle mower as seen looking in the working direction.

From U.S. Pat. No. 8,579,058 B1, a self-propelled lawnmower is known, having a sickle mower which contains a blower with a fan for generating blower air in order to clear the lawn to be mowed of leaves. In this case, the blower has a fan coupled to the drive of the sickle mower and a flexible blower air channel with an outlet opening on a nozzle. The outlet opening with the nozzle is movable on the lawnmower. It can be moved over the portion of the working region of the lawn mower preceding the active portion of the sickle mower as seen looking in the working direction. This makes it possible to direct the blower air generated in the blower with a flow direction running obliquely from top to bottom in relation to the working plane of the sickle mower through the outlet opening into a segment of the portion of the working region of the lawn mower preceding the active portion of the sickle mower.

SUMMARY

The problem addressed by this disclosure is, in particular, that of making possible an environmentally friendly and efficient maintenance of green areas and soil tillage as well as harvesting coarse fodder or cereal crops, but also the spraying of plants for pest control, in which small creatures, in particular insects, are spared.

This disclosure is based on the idea of removing small creatures, in particular insects, from the portion of the working region lying in front of the active portion of a machine tool during maintenance of green areas, soil tillage, but also when harvesting coarse fodder or cereal crops, by means of a gaseous fluid flow, in that they are blown away. The gaseous fluid flow for blowing away the small creatures can be provided by means of a blower that is basically suitable for blowing leaves.

An arrangement of equipment according to this disclosure contains an implement which has a machine tool for a working operation selected from the group comprising maintenance of green areas, mulching, mowing, soil tillage, harvesting coarse fodder, harvesting cereal crops, spraying, and which has an active portion which can be moved in a working direction through a working region.

An arrangement of equipment according to this disclosure comprises a blower for blowing away small creatures from a portion of the working region preceding the active portion of the machine tool in the working direction.

In a first embodiment of the arrangement of equipment according to this disclosure, the blower air for blowing away small creatures sweeps over the portion of the working region of the implement preceding the active portion of the machine tool in the working direction at least over a width $b_b$, which corresponds to the working width $b_w$ of the machine tool, in a direction running transversely to the working direction.

It is advantageous if the blower has a blower air register which has a plurality of outlet openings for the blower air to flow out into the portion of the working region of the implement preceding the active portion of the machine tool in the working direction. In this way, it can be achieved that the blower air is metered in the working region in front of the active portion of the machine tool and small creatures are blown out of the working region without being harmed.

A second embodiment of the arrangement of equipment according to this disclosure contains an implement which has a machine tool for a working operation selected from the group comprising maintenance of green areas, mulching, mowing, soil tillage, harvesting coarse fodder, harvesting cereal crops and spraying, and which has an active portion which can be moved in a working direction through a working region of the implement, and which has a blower for providing blower air in a portion of the working region preceding the active portion of the machine tool in the working direction, wherein the blower for blowing away small creatures contains a blower air register which has a plurality of outlet openings for the blower air to flow out into the portion of the working region preceding the active portion of the machine tool in the working direction. In this way, the blower air can be guided to different outlet openings with minimal flow losses.

It is advantageous if the blower air register can be pivoted about a pivot axis relative to the implement for adjusting the direction of the blower air exiting from the at least one outlet opening. In this way, the direction of the blower air in the portion of the working region of the implement preceding the active portion of the machine tool in the working direction can be adjusted to locations with a high probability of small creatures being present in the working region of the implement. The pivot axis is preferably arranged transversely to the working direction.

The blower in an arrangement of equipment according to this disclosure can have a device for generating a blower air flow and contain at least one guide means for guiding the blower air flow through at least one of the outlet openings with a flow direction running transversely or obliquely to the working direction.

The at least one guide means for guiding the blower air flow through the at least one outlet opening advantageously comprises a nozzle and/or a guide plate. It must be noted that the at least one guide means can be adjustable.

A third embodiment of the arrangement of equipment according to this disclosure contains an implement which has a machine tool for a working operation selected from the group comprising maintenance of green areas, mulching, mowing, soil tillage, harvesting coarse fodder, harvesting cereal crops and spraying, and which has an active portion which can be moved in a working direction through a working region of the implement, and which has a blower for providing blower air in a portion of the working region preceding the active portion of the machine tool in the working direction, wherein the blower provides the blower air for blowing away small creatures through different outlet openings with mean flow directions which, proceeding from a side of the implement facing a working vehicle, enclose an angle with the working direction, which increases with increasing distance of the outlet openings from the side facing the working vehicle.

In this way, it can be achieved that during an advance movement of the implement in the working direction, small creatures are blown out of the working region onto the side of the implement facing away from the working vehicle over the shortest possible distances such that they do not get into, and be harmed in, the active portion of the machine tool in the implement.

It must be noted that alternatively, it can also be provided that the blower provides the blower air for blowing away small creatures through different outlet openings with mean flow directions which, proceeding from a side of the implement facing away from a working vehicle, enclose an angle with the working direction, which increases with increasing distance of the outlet openings from the side facing away from the working vehicle.

It is advantageous if the blower has at least one outlet opening for the blower air to exit, which is arranged in the working direction both in front of, and laterally offset relative to, the active portion of the machine tool.

A fourth embodiment of the arrangement of equipment according to this disclosure contains an implement which has a machine tool for a working operation selected from the group comprising maintenance of green areas, mulching, mowing, soil tillage, harvesting coarse fodder, harvesting cereal crops and spraying, and which has an active portion which can be moved in a working direction through a working region of the implement, and which has a blower for providing blower air in a portion of the working region preceding the active portion of the machine tool in the working direction, wherein the blower for blowing away small creatures has at least one outlet opening for the blower air to exit, which is positioned next to the portion of the working region preceding the active portion of the machine tool in the working direction, and which is arranged in front of the active portion of the machine tool in the working direction.

The arrangement of equipment can have a device for generating a blower air flow and contain at least one guide means for guiding the blower air flow through the at least one outlet opening with a flow direction running transversely or obliquely to the working direction. The at least one guide means can be adjustable.

The blower can have a blower air channel for guiding the blower air flow to the at least one outlet opening.

It is advantageous if the blower air channel is guided in a pipe to a nozzle body in which the at least one outlet opening is formed. The nozzle body can be movably connected to the pipe. In particular, the arrangement of equipment can have a ball joint for moving the nozzle body relative to the pipe.

It is advantageous if the pipe is pivotably mounted in a pivot joint for moving the at least one outlet opening. The pivot joint can have a pivot axis perpendicular to the working direction.

An arrangement of equipment according to this disclosure can have a holding frame on which a deflection gear is fixed, which has an interface for connecting a cardan shaft to be connected to a cardan shaft drive of a working vehicle, which has a first output rotationally coupled to a first gear for driving the machine tool in the implement, and which has a second output with a second gear for driving the device for generating a blower air flow in the blower air channel of the blower.

The arrangement of equipment can contain an electric motor or a hydraulic motor for driving the device for generating a blower air flow in the blower air channel of the blower.

The implement can in particular be an implement selected from the group comprising combine harvester, corn chopper, mulcher, mower, or rotary tiller. In particular, the blower can be fixed to a holding frame for holding the machine tool in the implement.

A working vehicle according to this disclosure contains an arrangement of equipment as described above for moving the active portion of the machine tool of the implement through the working region in the working direction. This disclosure also comprises a working vehicle having an arrangement of equipment for moving the active portion of the machine tool of the implement through the working region in the working direction, with a working vehicle frame on which the blower, relative to the working direction, is accommodated at the front side and the implement is accommodated at the rear side.

In a method according to this disclosure for carrying out a working operation selected from the group comprising maintenance of green areas, mowing, mulching, soil tillage, harvesting coarse fodder, harvesting cereal crops and spraying, a machine tool, which has an active portion, is moved in a working direction through a working region, wherein, for blowing small creatures out of a portion of the working region preceding the active portion of the machine tool in the working direction, a gaseous fluid flow is provided which sweeps over the portion of the working region preceding the active portion of the machine tool in the working direction at least over a width $b_b$, which corresponds to the working width $b_w$ of the machine tool, in a direction running transversely to the working direction.

In a method according to this disclosure for carrying out a working operation selected from the group comprising maintenance of green areas, mowing, mulching, soil tillage, harvesting coarse fodder, harvesting cereal crops and spraying, a machine tool, which has an active portion, is moved in a working direction through a working region, wherein, for blowing small creatures out of a portion of the working region preceding the active portion of the machine tool in the working direction, a gaseous fluid flow is provided which, in the portion of the working region preceding the active portion of the machine tool in the working direction, has an average flow velocity v, for which the following applies: m/s≤v≤300 m/s, preferably 150 m/s≤v≤260 m/s.

In this way, an efficient and at the same time gentle removal of small creatures, such as bees, from the portion of a working region preceding the machine tool is made possible.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
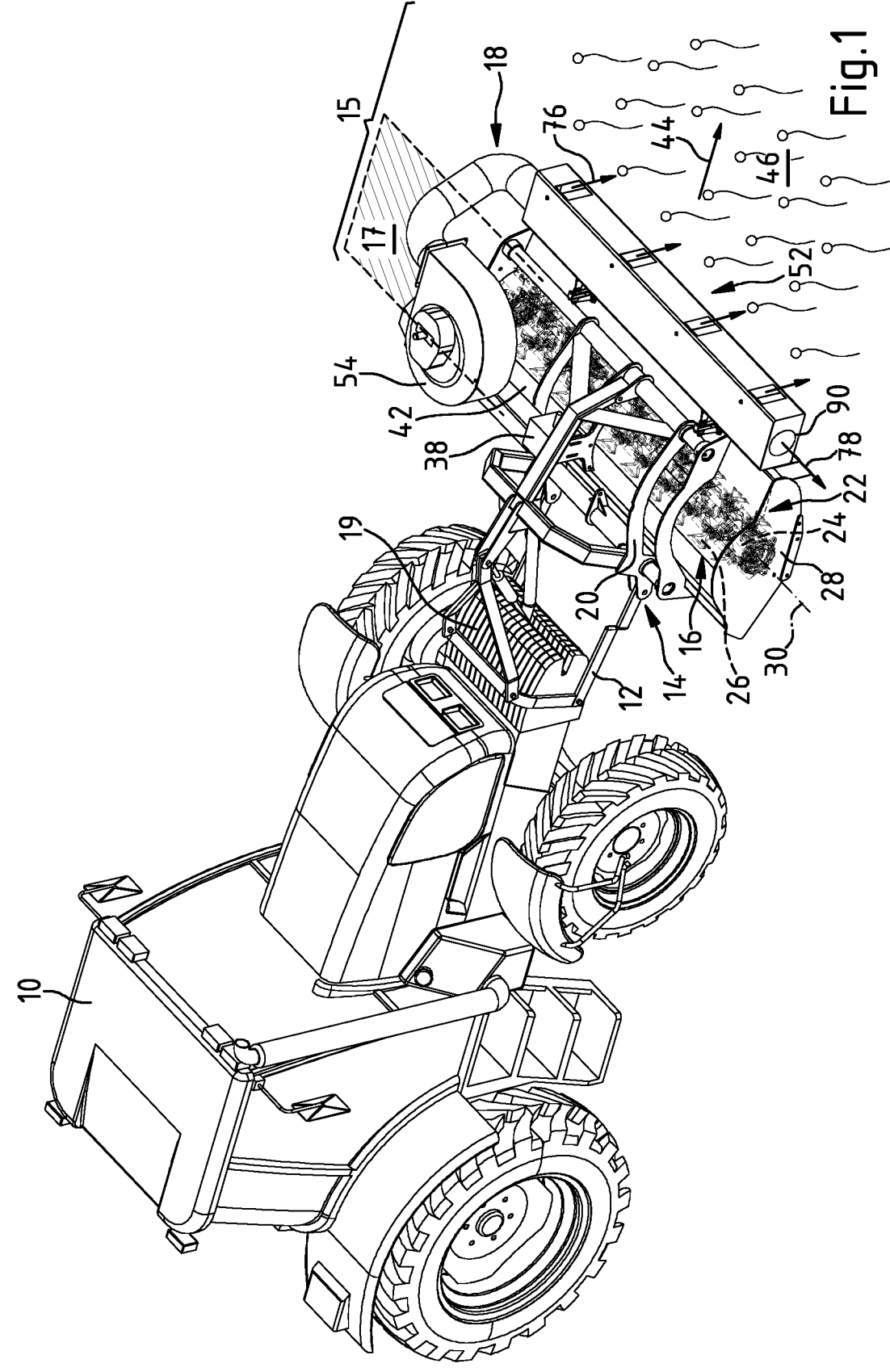
FIG. 1 is a perspective view of a working vehicle having a first arrangement of equipment with an implement designed as a mulcher.

The working vehicle 10 shown in FIG. 1 is a tractor that carries an arrangement of equipment 15 with an implement 16 designed as a mulcher, which is combined with a blower 18, on a front linkage 12 with an interface 14 designed as a standard three-point cat 1. The implement 16 has a holding frame 20 and contains a machine tool 22 with a rotor shaft 24, to which tools 26 designed as flails are connected. The rotor shaft 24 is rotatably mounted about its rotor shaft axis 30 on a rotor shaft carrier 28 rigidly connected to the holding frame 20. The tools 26 designed as flails are accommodated on the circumference of the rotor shaft 24 and mounted thereon so as to be pivotable about a pivot axis 34 parallel to the rotor shaft axis 30.

Figure 2:
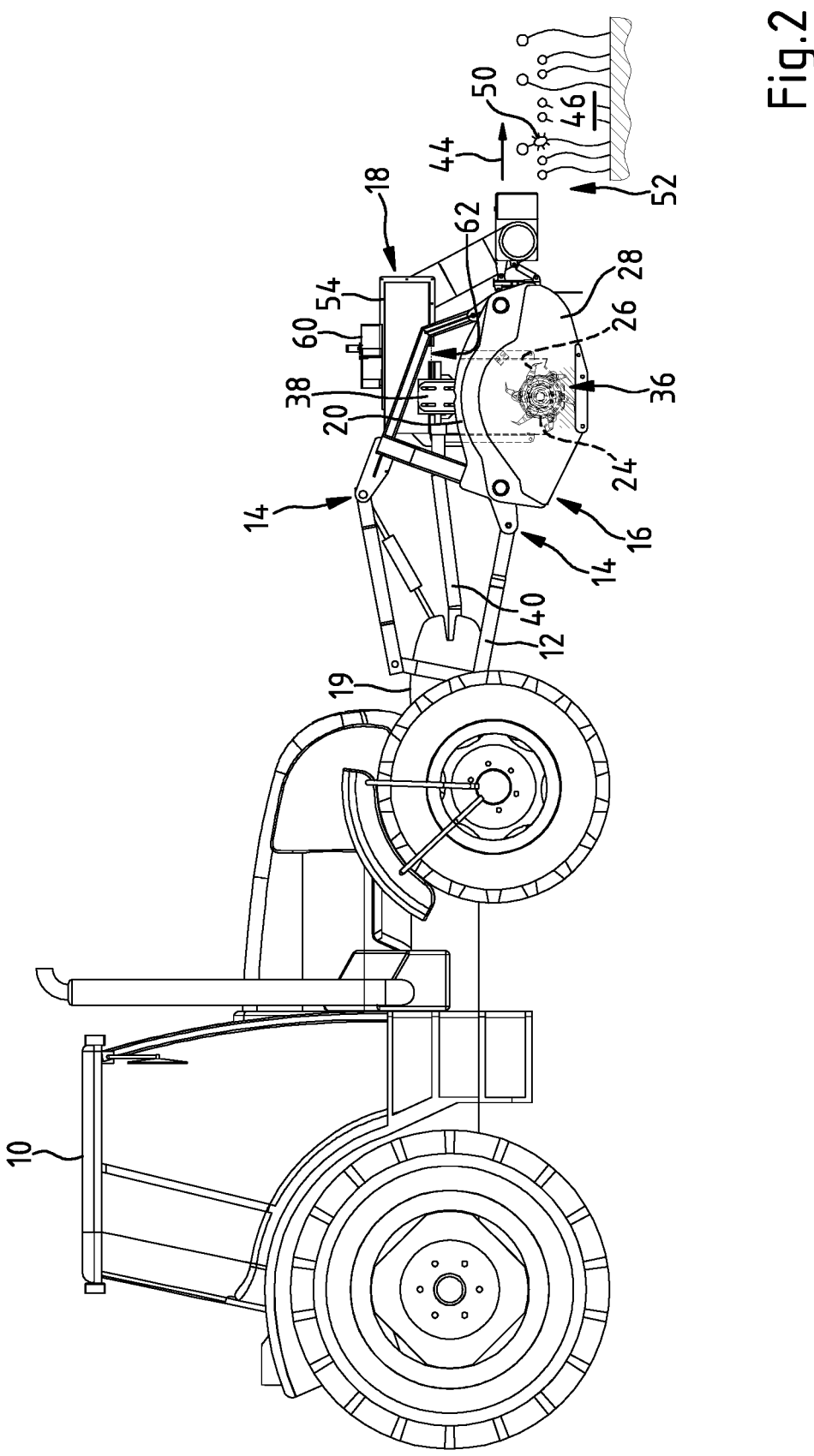
FIG. 2 is a side view of the working vehicle having the arrangement of equipment.
Figure 3:
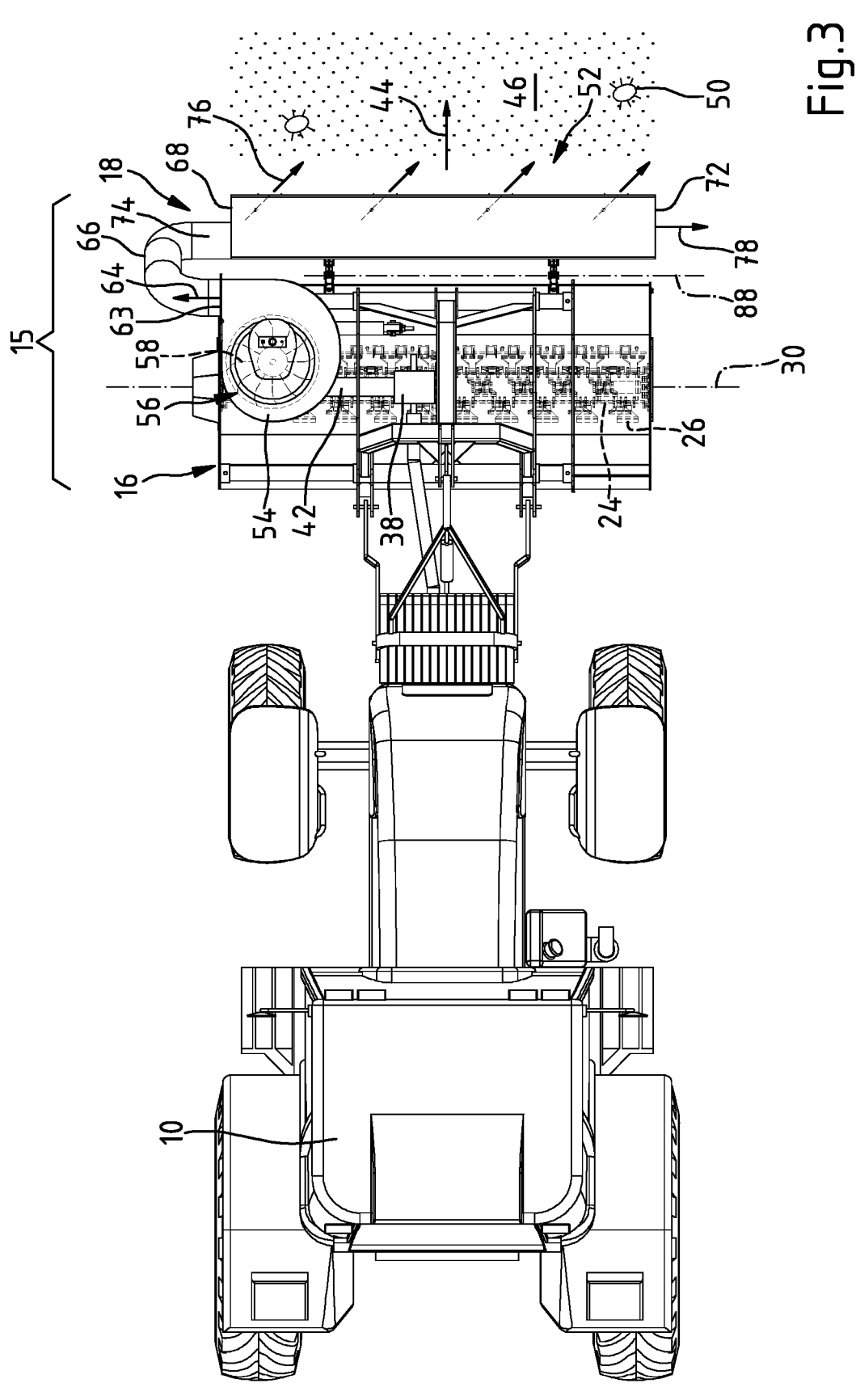
FIG. 3 is a plan view of the working vehicle having the arrangement of equipment.

FIG. 2 is a side view of the working vehicle 10 having the arrangement of equipment 15. FIG. 3 is a plan view of the working vehicle 10 having the arrangement of equipment 15.

For driving the rotor shaft 24, a deflection gear 38 fixed to the holding frame 20 is included in the implement 16, which has an interface for connecting to a power take-off shaft 40 for connecting to a cardan shaft drive of the working vehicle 10 and which has an output to a drive shaft 42 which is connected to a V-belt gear for driving the rotor shaft 24. The rotor shaft 24 rotates during mulching with the mulcher at a high speed which, e.g., can be 2,000 rpm to 3,000 rpm or even more. When the rotor shaft 24 rotates, the tools 26 accommodated thereon chip off green waste and shred cut wood and/or straw, in particular corn stalks which are located in an active portion 36 of the machine tool 22.

The working vehicle 10 can be used to move the active portion 36 of the machine tool 22 in the implement 16 in a working direction 44 indicated by an arrow in order to mulch in a working region 46. The front linkage 12 allows for the arrangement of equipment 15 to be raised and lowered on the working vehicle 10, wherein the position of a working plane 17 of the implement 16 can be adjusted for the implement 16 relative to the working vehicle frame 19. The blower 18 is connected to the holding frame 20 of the implement 16. The blower 18 is used to blow small creatures 50 out of a portion 52 of the working region 46 preceding the active portion 36 of the machine tool 22 in the working direction.

As a device 54 for generating a blower air flow, the blower 18 has a fan with a housing in which a fan turbine wheel 56 having turbine blades 58 is arranged. The fan turbine wheel 56 is motion-coupled by means of a step-up gear 60 to the drive shaft 42 connected to the V-belt gear for driving the rotor shaft 24 of the implement 16. As the fan turbine wheel 56 rotates in the housing of the fan, ambient air is suctioned in through a suction opening 62 of the housing, and blower air is provided at a fan exit opening 63 with a blower air flow running in the direction of the arrow 64. The blower 18 contains a flexible pipe 66 connected to the fan exit opening 63. This flexible pipe 66 communicates with a blower air register 68 which has a plurality of front-side outlet openings 70 for blower air and a lateral outlet opening 72 for blower air. The blower air generated by the fan in the blower 48, which is guided in the fan from the fan exit opening 63 through a blower air channel 74 to the outlet openings 70, 72, which runs through the pipe 66 and extends into the blower air register 68, can exit through the outlet openings 70, 72 in the blower air register 68 in the directions indicated by the arrows 76, 78 transverse to the working direction 44.

Figure 4:
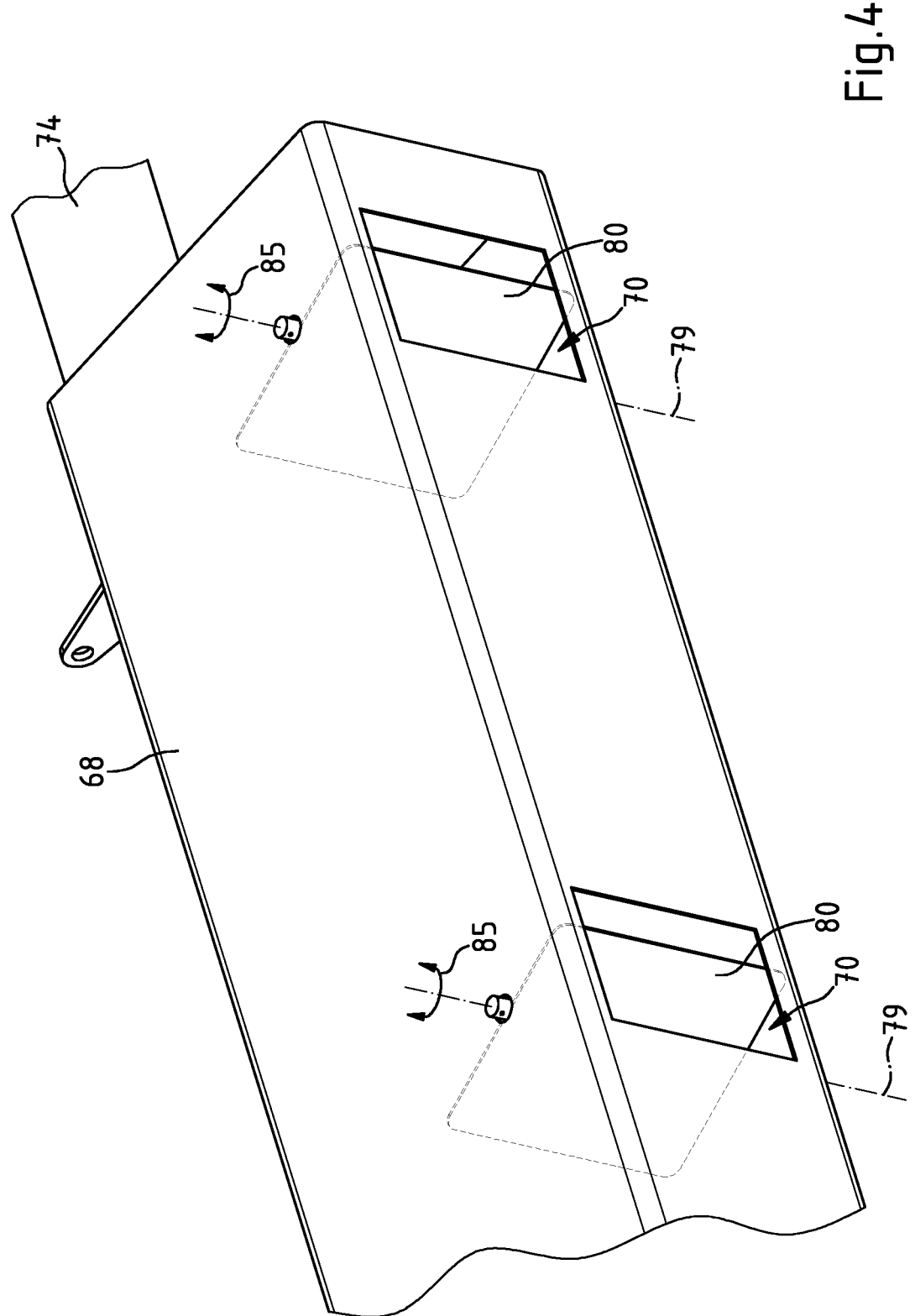
FIG. 4 is a partial view of a blower air register in the arrangement of equipment.

FIG. 4 is a perspective partial view of the blower air register 68 of the blower 18 in the arrangement of equipment 15. A plurality of guide plates 80 are arranged in the blower air register 68 and can each be pivoted about a pivot axis 79 perpendicular to the rotor shaft axis 30 of the rotor shaft 24 of the implement 16. These guide plates 80 act as guide means for guiding the blower air flow in the blower air channel 74 of the blower 18. By adjusting the guide plates 80 in the blower air register 68 about the pivot axis 79 in accordance with the double arrow 85, the direction of the blower air generated by the fan can be adjusted, said blower air exiting through the front-side outlet openings 70 of the blower air register 68. In this way, it is possible to adjust the direction in which the blower air reaches the portion 52 of the working region 46 preceding the active portion 36 of the machine tool 22, as seen looking in the working direction, e.g., to slopes and different grass heights.

Figure 5:
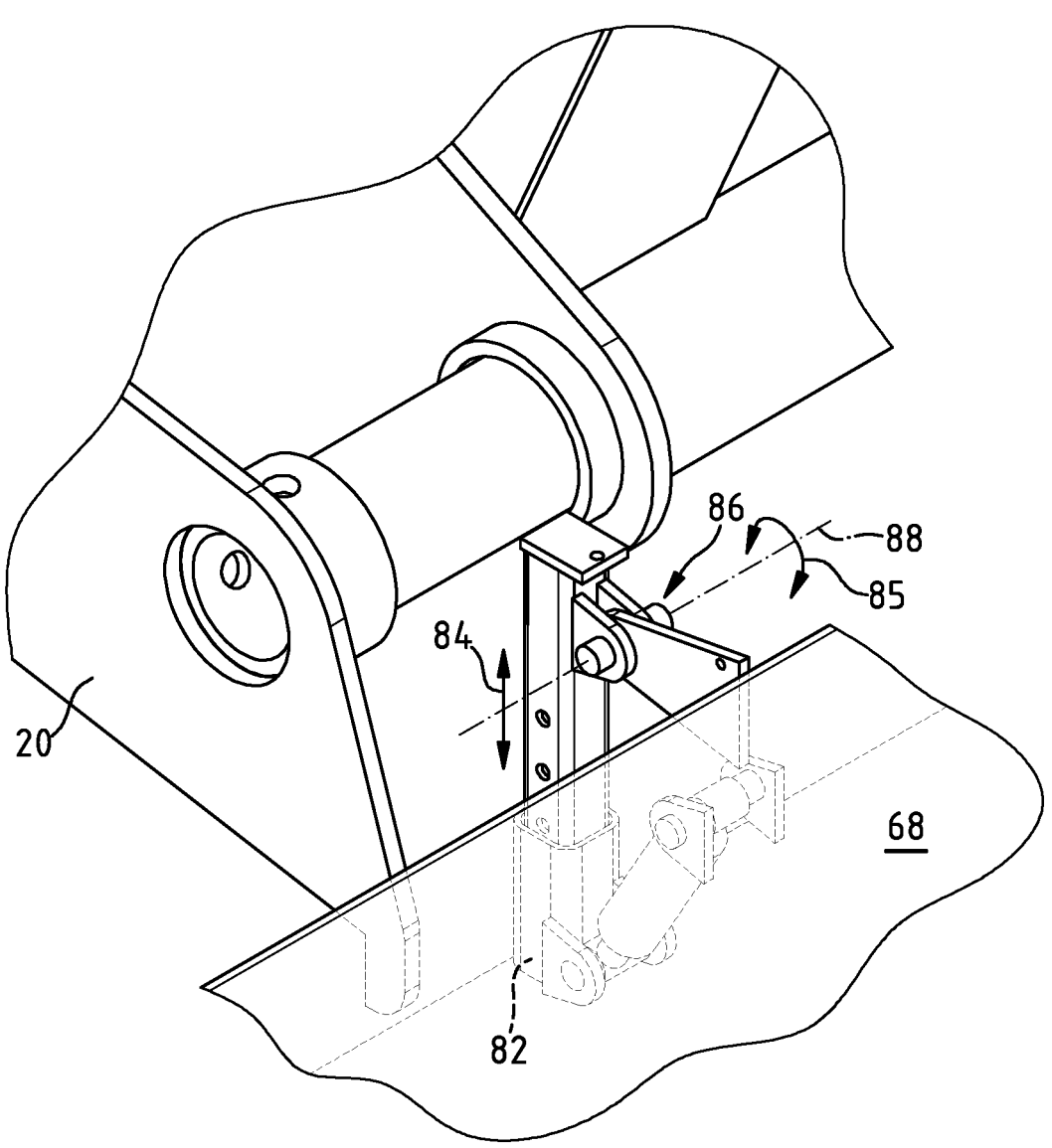
FIG. 5 is a partial view of the implement and the blower air register in the arrangement of equipment.

FIG. 5 is a partial view of the implement 16 and the blower air register 68 of the arrangement of equipment 15. The blower air register 68 is fixed to the holding frame 20 of the implement 16. The blower air register 68 can be moved on the holding frame 20 in a linear guide 82 in a direction perpendicular to the working plane 17 of the implement 16 in accordance with the double arrow 84, which carries the blower air register 68 with a first and a second pivot joint 86, each having a pivot axis 88 parallel to the rotor shaft axis 30.

By moving the blower air register 68 on the holding frame 20 of the implement 16, it is possible to vary the direction of the blower air of the blower 18 exiting through the outlet openings 70 in relation to the working plane 17 of the implement 16 and the working direction 44 in which the working vehicle 10 moves with the arrangement of equipment 15. In the case of the arrangement of equipment 15 accommodated on the working vehicle 10, blower air directed into a portion 52 of working region 46 can thus be provided in the active portion 36 of the machine tool 22 preceding the active portion 36 of the machine tool 22 in the working direction 44, indicated by the arrow. Since the generated blower air flows through the portion 52, small creatures 50, in particular insects, are blown out of said portion, so that they cannot get into the active portion 36 of the machine tool 22.

It has been found that, if an air flow of around 10 cbm to around 500 cbm, preferably around 50 cbm to around 200 cbm, particularly preferably around 80 cbm to around 150 cbm of air per minute is provided in the arrangement of equipment 15 by means of the blower 18 at a flow rate of around 100 m/s to around 300 m/s, preferably around 150 m/s to around 260 m/s, around 90% to 95% of the insects and small creatures 50 in the working region 46 can be protected by being blown away in front of the machine tool 22 in the implement 16.

Figure 6:
FIG. 6 is a working vehicle having a second arrangement of equipment.

FIG. 6 shows a working vehicle 10 having a further arrangement of equipment 15. Insofar as the assemblies and elements of this arrangement of equipment correspond to the assemblies and elements of the arrangement of equipment 15 described with reference to FIGS. 1 to 5, they are denoted by the same numbers as reference signs. The arrangement of equipment 15 shown in FIG. 6 also contains, as an implement 16, a mulcher with a rotor shaft 24 to which tools 26 designed as flails are connected. The arrangement of equipment 15 includes a blower 18 which contains a fan turbine wheel 56 rigidly connected to the rotor shaft 24. The blower 18 has a blower air channel 74 which is guided through a pipe 66 to a nozzle 90, through which the blower air exits as a blower air flow which is essentially parallel to the rotor shaft axis 30 and runs on the side of the rotor shaft 24 facing away from the working vehicle 10 from the outlet opening 72 of the nozzle 90 to the side of the implement 16 opposite the fan turbine wheel 56 in the arrangement of equipment 15. In this case, the blower air flow is guided in the direction of arrow 78 below a protective cover 92 of the implement 16 transversely to the working direction 44, indicated by the arrow, through a portion of the working region 46 preceding the active portion of the machine tool 22 with the rotor shaft 24 and the tools 26 designed as flails in the working direction 44 in order to blow small creatures located in the working region 46 to the side, so that they do not get into the active portion of the machine tool 22. For this purpose, the outlet opening 72 of the nozzle 90 is arranged in front of, and laterally offset relative to, the active portion of the machine tool 22, as seen looking in the working direction 44. The outlet opening 72 of the nozzle 90 is thus located next to the portion of the working region 46 which, as seen looking in the working direction 44, is arranged in front of the active portion 36 of the machine tool 22 and adjoins the active portion of the machine tool 22.

Figure 7:
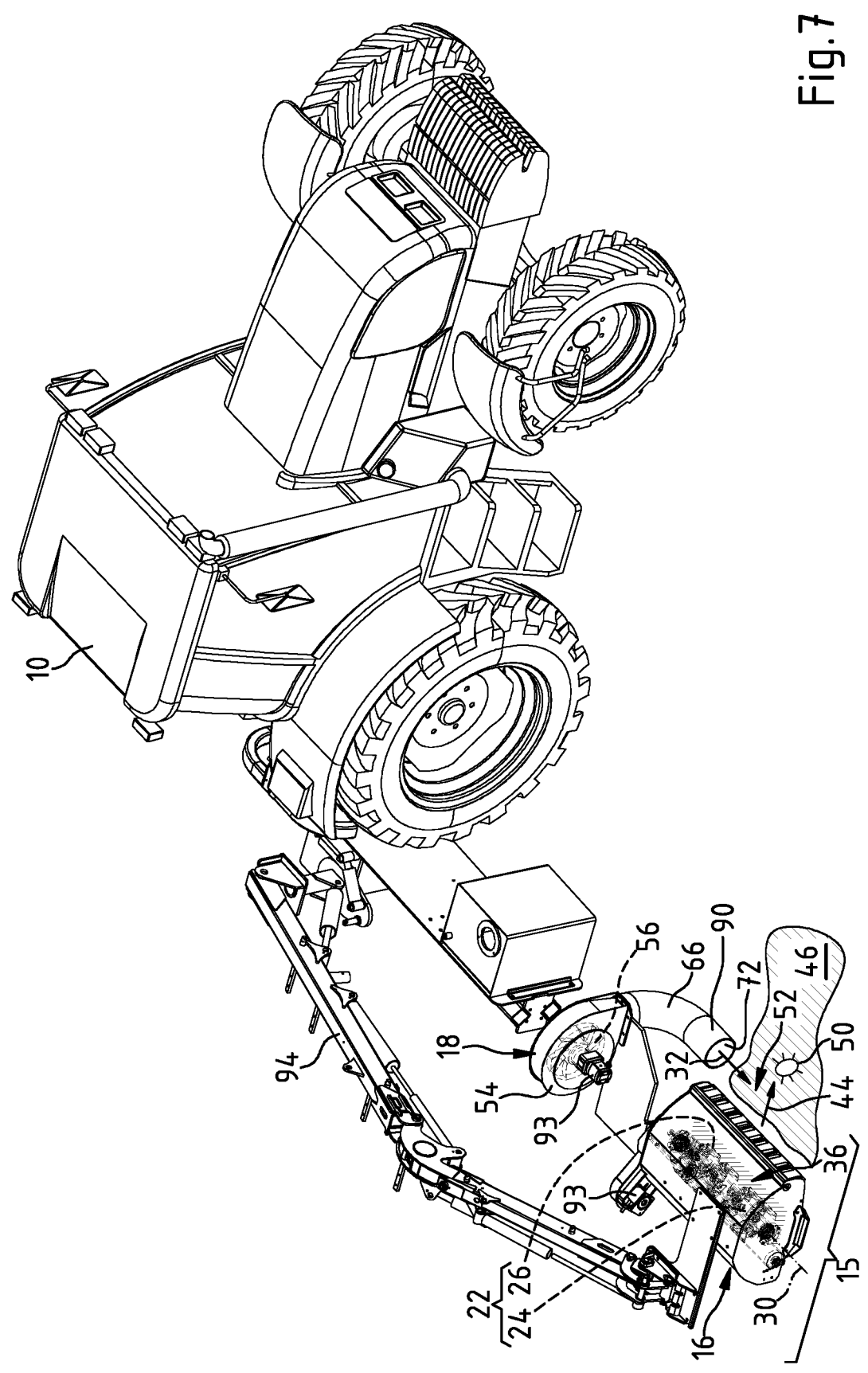
FIG. 7 is a perspective view of the working vehicle having a further arrangement of equipment which has an implement designed as a mulcher.

FIG. 7 shows a working vehicle 10 having a further arrangement of equipment 15. The arrangement of equipment 15 shown in FIG. 7 contains, as an implement 16, a mulcher which is accommodated on a boom arm 94 connected to the rear of a working vehicle 10. The implement 16 has a rotor shaft 24 driven by a hydraulic motor 93 with tools 26 designed as flails. The arrangement of equipment 15 includes a blower 18 having a fan turbine wheel 56 which is also driven by a hydraulic motor 93.

The blower 18 has a blower air channel which is guided through a pipe 66 to an outlet opening 72, through which the blower air exits as a blower air flow which is essentially parallel to the rotor shaft axis 30 and runs on the side of the rotor shaft 24 facing away from the working vehicle 10 from the outlet opening 72 of the nozzle 90 to the side of the implement 16 opposite the fan turbine wheel 56 in the arrangement of equipment 15. In this case, the blower air flow runs, in accordance with the arrow, in a direction 32 parallel to the rotor shaft axis 30 transversely to the working direction 44, indicated by the arrow, through a portion 52 of the working region 46 preceding the active portion of the machine tool 22, in order to once again blow small creatures 50 located in the working region 46 to the side. For this purpose, the outlet opening 72 of the nozzle 90 precedes the active portion 36 of the machine tool 22 in the working direction 44. It is also located next to the portion of the working region 46 which is arranged in front of the active portion 36 of the machine tool 22 in the working direction 44 and adjoins the active portion 36 of the machine tool.

Figure 8:
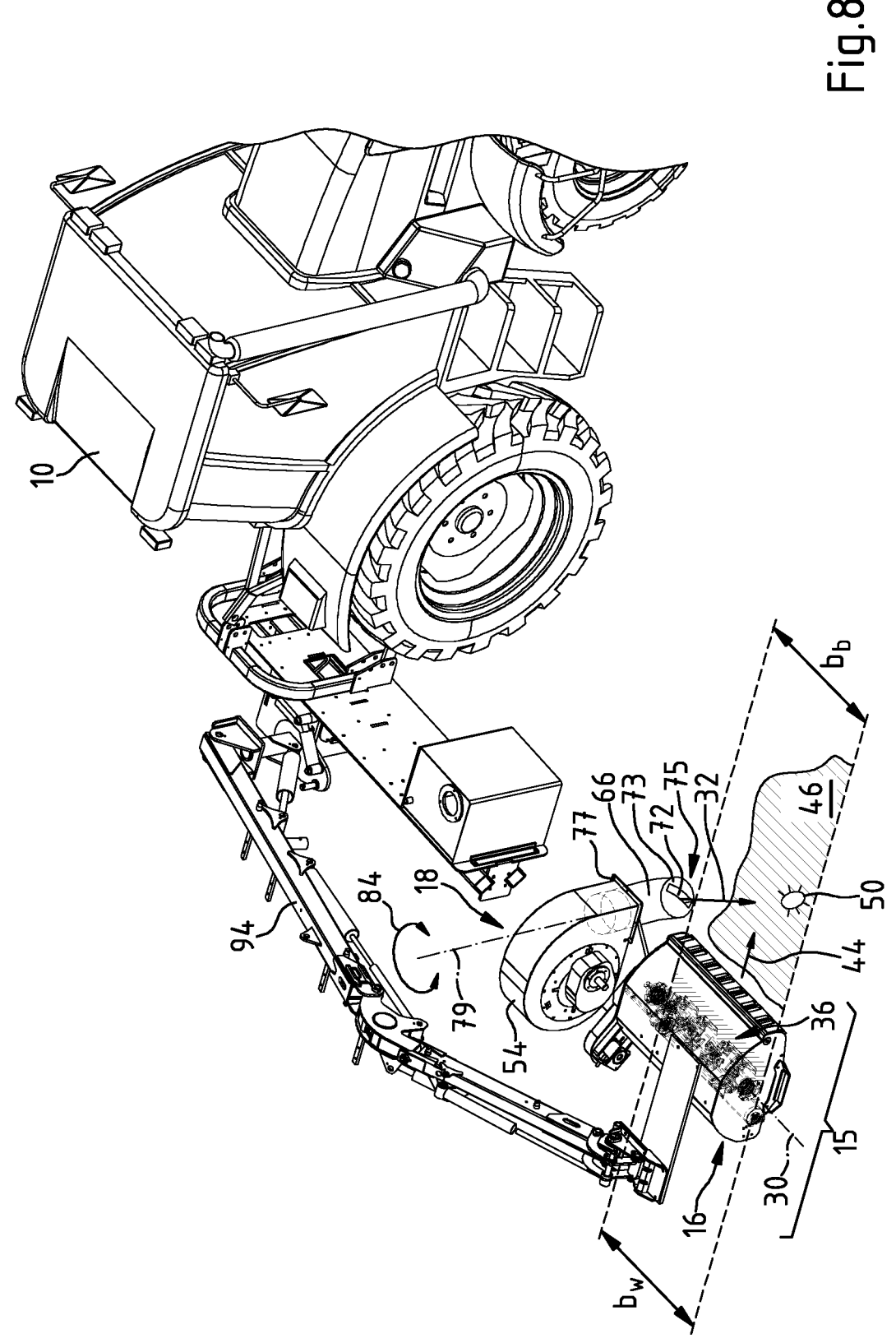
FIG. 8 is a perspective view of the working vehicle having a further arrangement of equipment which has an implement designed as a mulcher.
Figure 9:
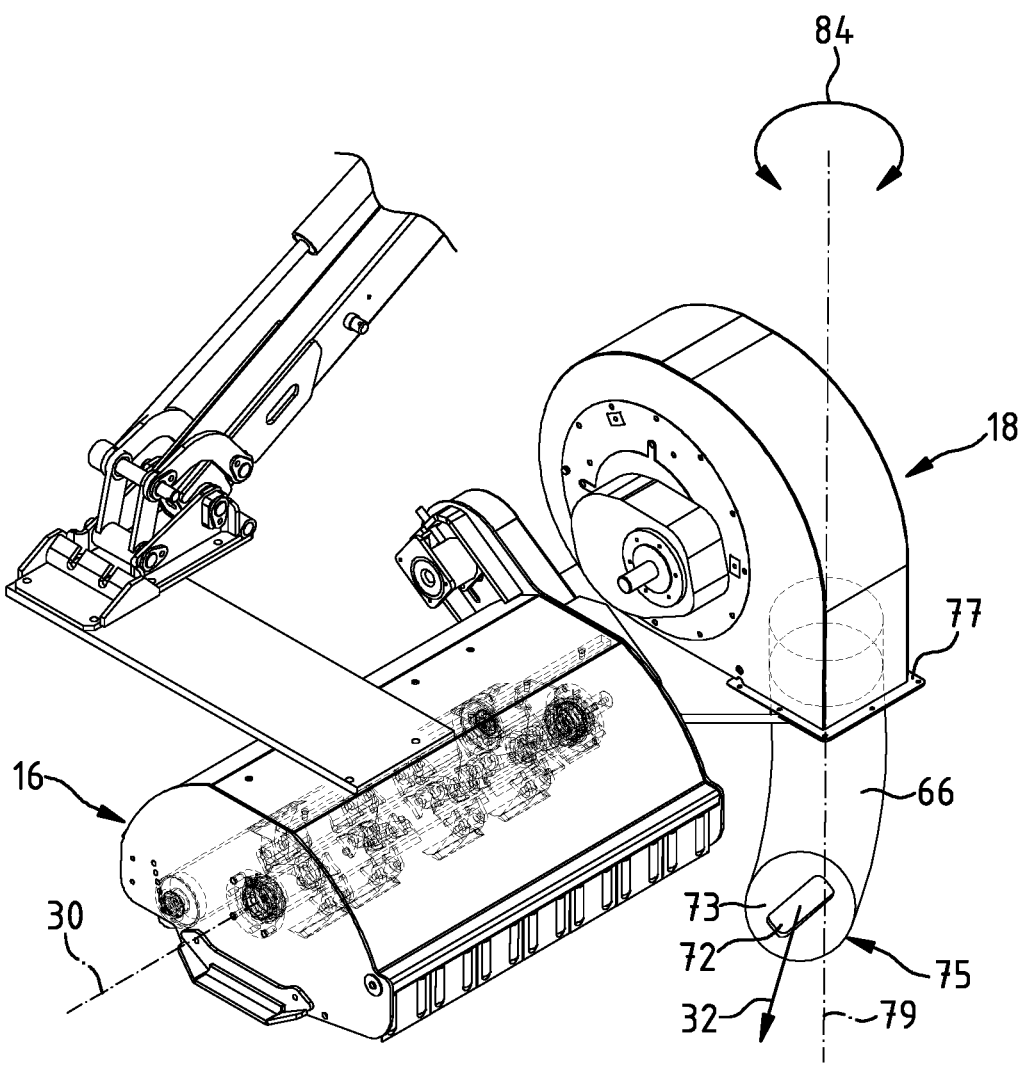
FIG. 9 to FIG. 13 is the implement with different settings of a nozzle body.
Figure 10:
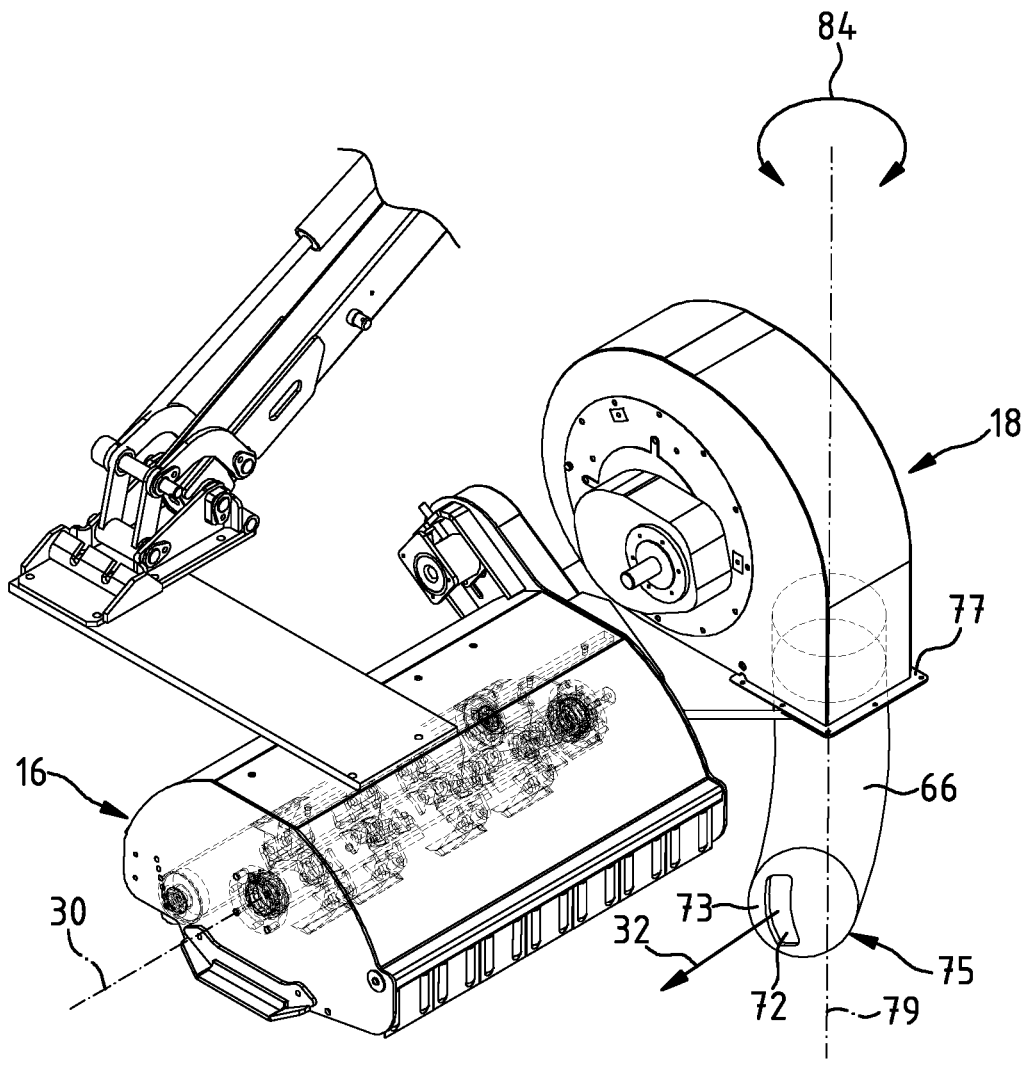
Figure 11:
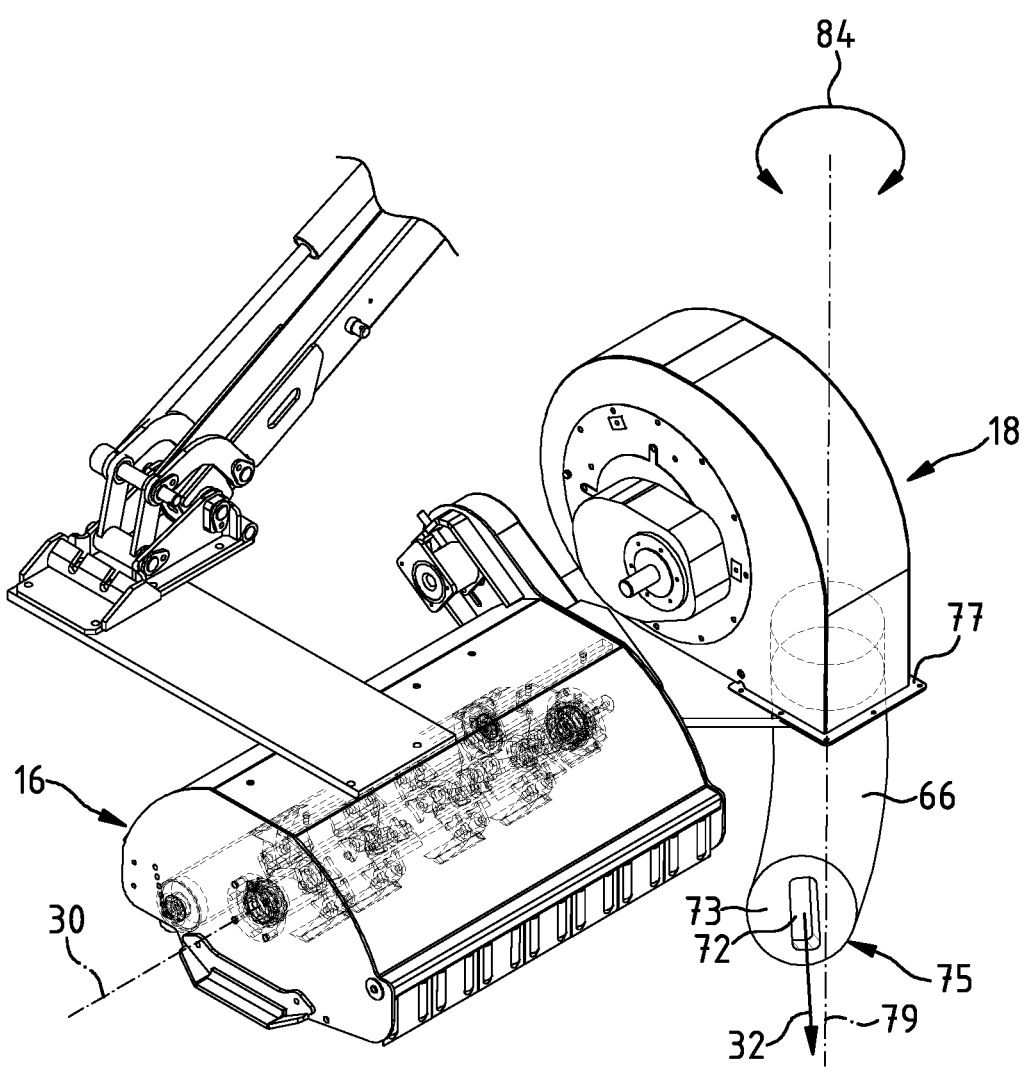
Figure 12:
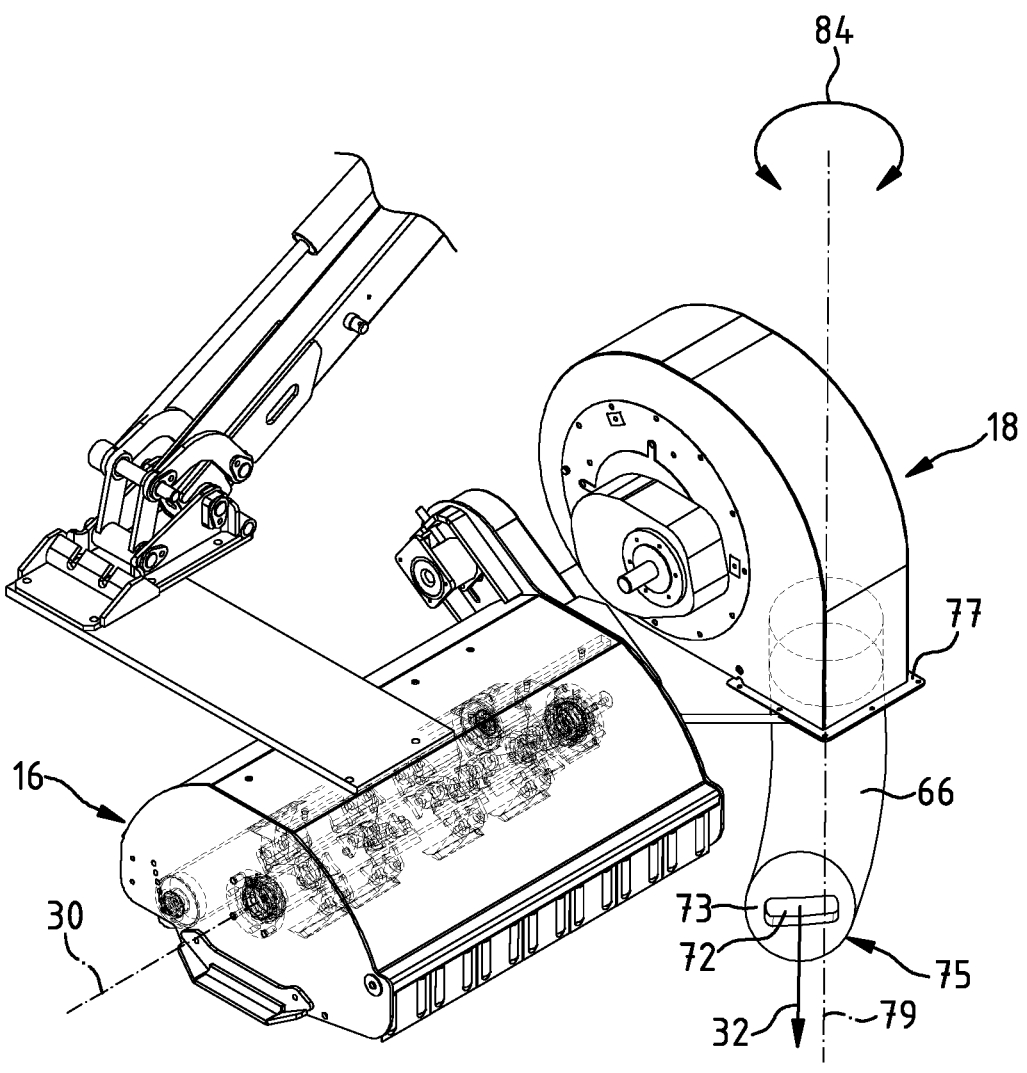
Figure 13:
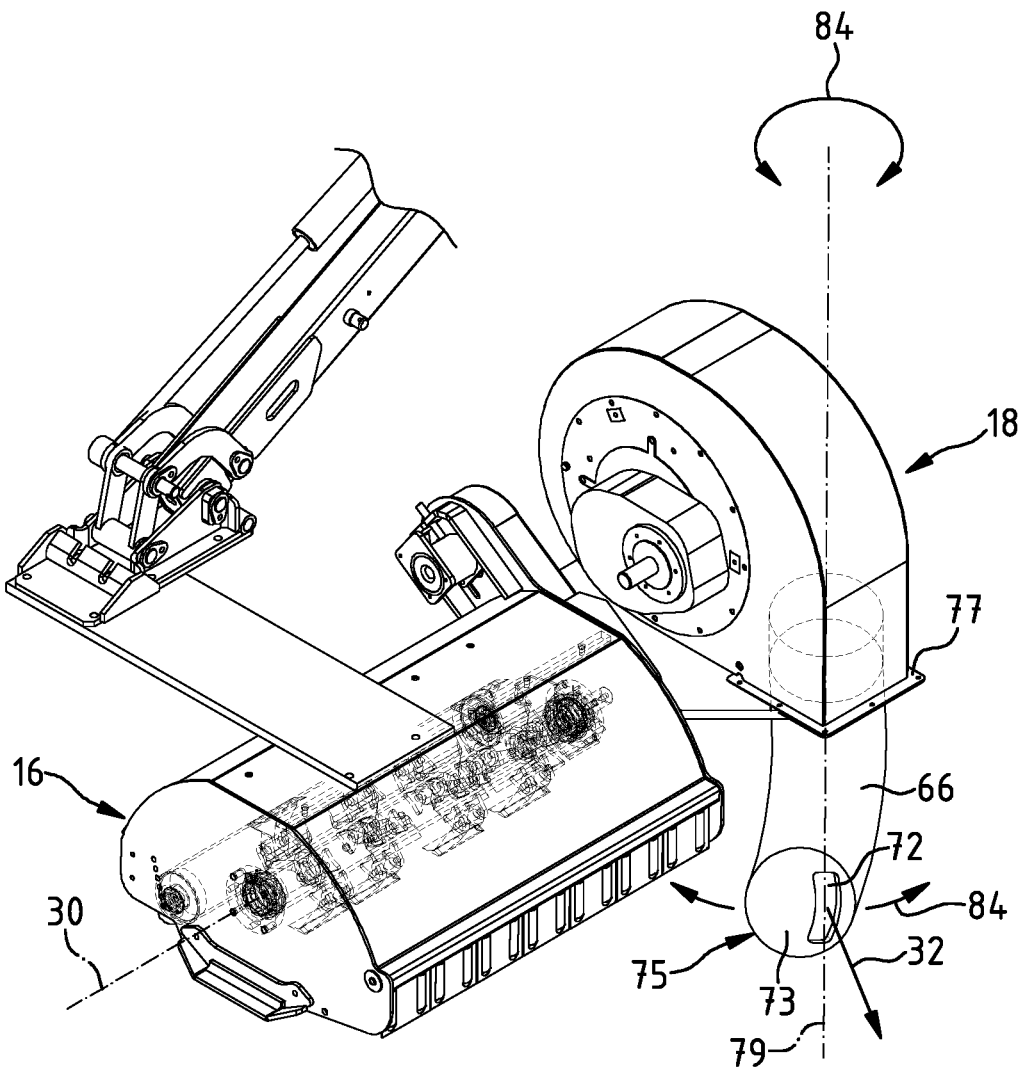

FIG. 8 shows a working vehicle 10 having a further arrangement of equipment 15 with an implement 16 designed as a mulcher. Insofar as the assemblies and elements of this arrangement of equipment correspond to the assemblies and elements of the arrangement of equipment 15 described with reference to FIG. 7, they are denoted by the same numbers as reference signs. In this case, the arrangement of equipment 15 with the blower 18 is accommodated on a boom arm 94 connected to the rear of the working vehicle 10. The blower air channel 74 of the blower 18 runs through a pipe 66 to a nozzle having a nozzle body 73 which is connected to the pipe 66. The nozzle body 73 is mounted in the pipe 66 in a ball joint 75. The blower 18 in turn has a pivot joint 77 which holds the pipe 66. The pivot joint 77 has a pivot axis 79 which is perpendicular to the working direction 44 of the implement 16. The pipe 66 is curved in an arch-shaped manner and can be moved about the pivot axis 79 of the pivot joint 77 in accordance with the double arrow 84. FIGS. 9 to 13 show the implement 16 with different settings of the nozzle body 73 on the pipe 66. By pivoting the pipe 66, it is possible to arrange the outlet opening 72 for the exit of the blower air generated by the blower 18 in the working direction 44 in front of, and laterally offset to, the active portion 36 of the machine tool 22. The nozzle body 73 can be adjusted in the ball joint 75 on the pipe 66 such that the blower air for blowing away small creatures 50 sweeps over the portion of the working region 46 of the implement 16 preceding the active portion 36 of the machine tool 22 in the working direction 44 over a width $b_b$, which corresponds to the working width $b_w$ of the machine tool 22, in a direction running transversely to the working direction 44.

Figure 14:
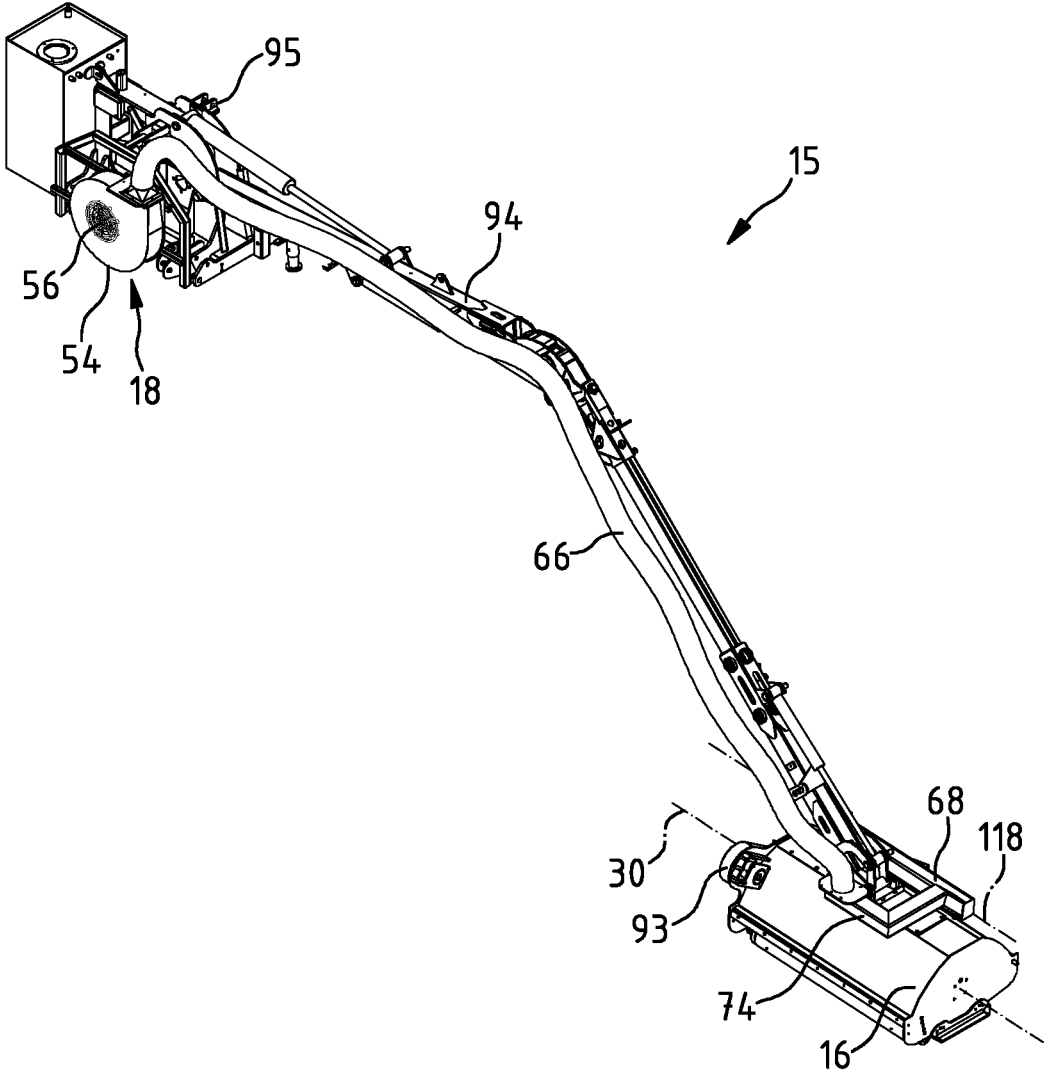
FIG. 14 is a further arrangement of equipment for connecting to a working vehicle which has an implement designed as a mulcher.
Figure 15A:
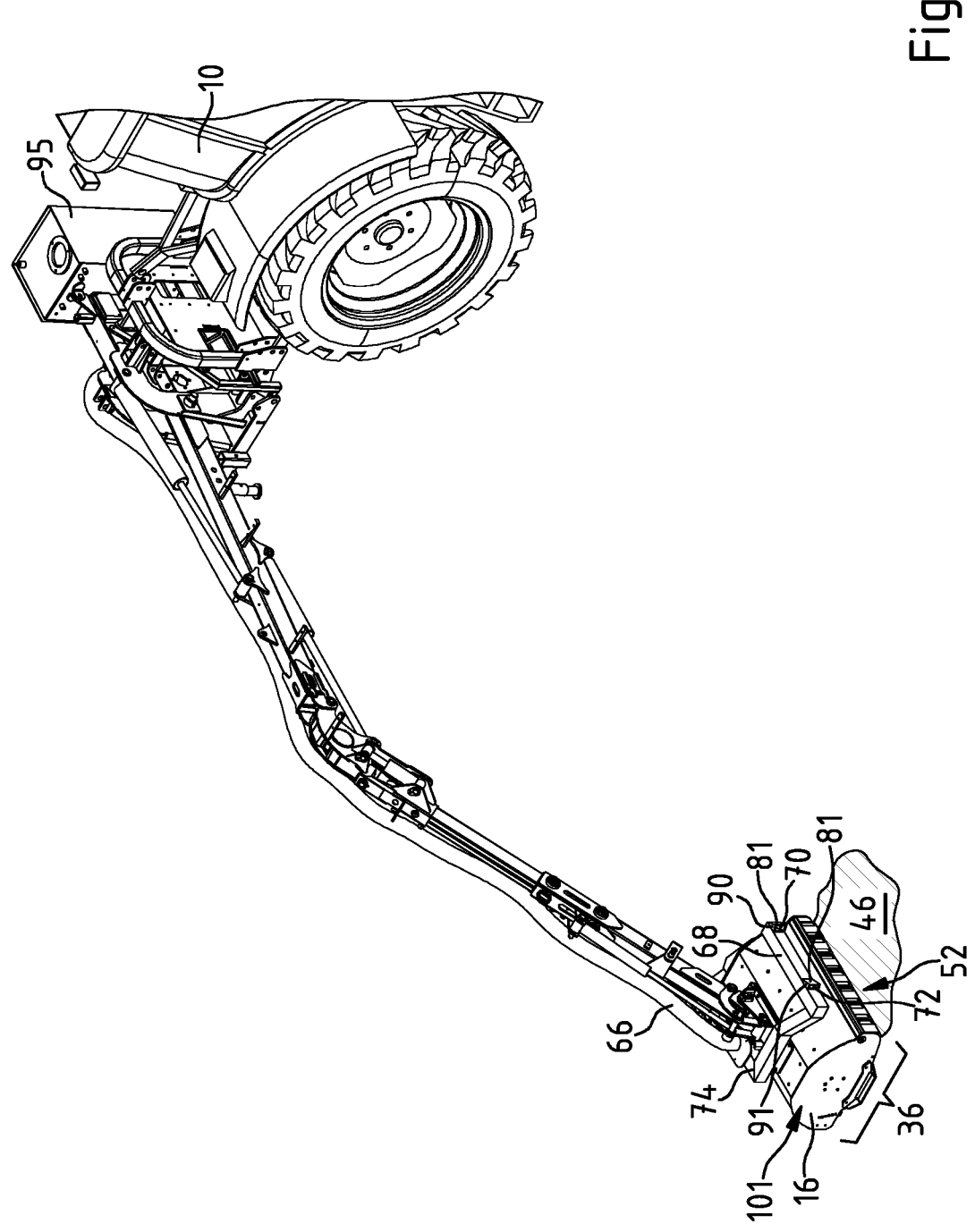
FIG. 15a is a partial view of the further arrangement of equipment connected to a working vehicle.
Figure 15B:
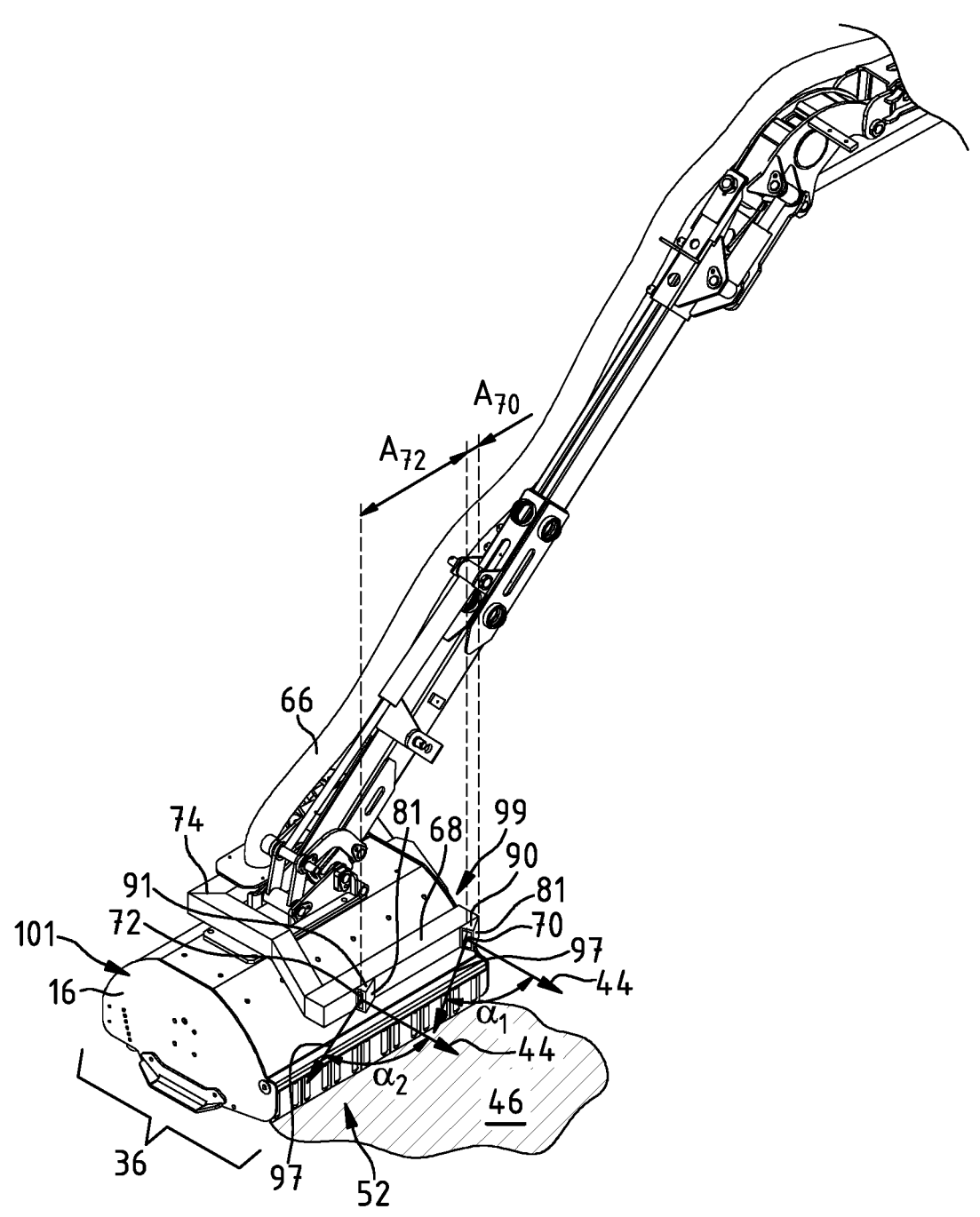
FIG. 15b is a partial view of the further arrangement of equipment.

FIG. 14 shows a further arrangement of equipment 15 for connecting to a working vehicle. The arrangement of equipment 15 contains an implement 16 designed as a mulcher. FIG. 15a is a partial view of the arrangement of equipment 15 with a working vehicle 10. FIG. 15b is a further partial view of the arrangement of equipment 15. The implement 16 is connected to a boom arm 94 which is pivotably attached to a boom arm base 95 which can be connected, for example, with a standard three-point cat 1 interface, to a linkage arranged at the rear of the working vehicle 10.

The implement 16 has, as a machine tool, a rotor shaft driven by a hydraulic motor 93 with tools designed as flails, which rotates at a high speed, e.g., at 2,000 rpm to 3,000 rpm or even more, about a rotor shaft axis 30.

The arrangement of equipment 15 contains a blower 18 with a fan turbine wheel 56 which is mounted in a pivot bearing on the boom arm base 95 and can be driven by means of a hydraulic motor to generate blower air. The blower 18 in the arrangement of equipment 15 has a flexible pipe 66 which is connected to a blower air channel 74 which is fixed to the machine frame of the implement 16 and opens into a blower air register 68. The blower air generated by rotating the fan turbine wheel can be guided into the blower air register 68 through the flexible pipe 66 and the blower air channel 74.

The blower air register 68 extends in a direction 118 parallel to the rotor shaft axis 30. A first nozzle 90 with an outlet opening 70 for blower air and a second nozzle 91 with an outlet opening 72 for blower air are connected to the blower air register 68.

The first nozzle 90 is located on an end portion of the blower air register 68 facing the working vehicle 10. It is positioned next to the portion 52 of the working region 46 machine tool preceding the active portion 36 of the machine tool in the working direction and arranged in front of the active portion 36 of the machine tool in the working direction 44.

The second nozzle 91 is connected to the blower air register 68 on a side of the first nozzle 90 facing away from the working vehicle 10.

The nozzles 90, 91 each have a flow guide body 81 which directs the blower air from the blower air register 68 through the outlet openings 70, 72 into the portion 52 of the working region 46 of the implement 16 preceding the active portion 36 of the flails attached to the rotor shaft in the working direction 44.

The following applies to the size ratio Q of the cross-sectional surface A2 of the outlet opening 72 of the second nozzle 91 to the cross-sectional surface A1 of the outlet opening 70 of the first nozzle 91:

$$Q = A2/A1 \approx 60\%$$

By means of the fan turbine wheel 56, the blower 18 can generate a blower air flow which exits at a flow rate of around 160 m/s from the outlet opening 70 of the first nozzle 90 and at a flow rate of around 260 m/s from the outlet opening 72 of the second nozzle 91 with a flow direction 97 running obliquely to the working direction 44.

The flow guide body 81 of the nozzle 90 causes the mean flow direction 97 of the blower air passing through the outlet opening 70 to run at an angle $\alpha 1 \approx 70°$ to the working direction 44 in a plane parallel to the working direction 44 and the rotor shaft axis 30. In contrast, the flow guide body 81 of the nozzle 91 directs the blower air in a mean flow direction 97 which lies in a plane parallel to the working direction 44 and the rotor shaft axis 30 and encloses the angle α1≈80° with the working direction 44.

By means of the blower 18 in the arrangement of equipment 15, the blower air for blowing small creatures out of the working region 46 is provided from the different outlet openings 70, 72 with a mean flow direction 97 which is also different. The greater the angle α1, α2, which the mean flow direction 97 forms at an outlet opening 70, 72 with the working direction 44, the larger the distance $A_{70}$, $A_{72}$ of an outlet opening 70, 72 from the side 99 of the implement 16 facing the working vehicle 10. The effect of this measure is that, during an advance movement of the implement 16 in the working direction 44, small creatures are blown out of the working region 46 onto the side of the implement 16 facing away from the working vehicle 10 over the shortest possible distances such that they do not get into, and be harmed in, the active portion of the machine tool in the implement 16.

It must be noted that in a modified embodiment of the arrangement of equipment 15, it can be provided that the greater the angle α1, α2 formed by the mean flow direction 97 at an outlet opening 70, 72 with the working direction 44, the greater the distance of an outlet opening 70, 72 from the side 101 of the implement 16 facing away from the working vehicle 10.

Figure 16:
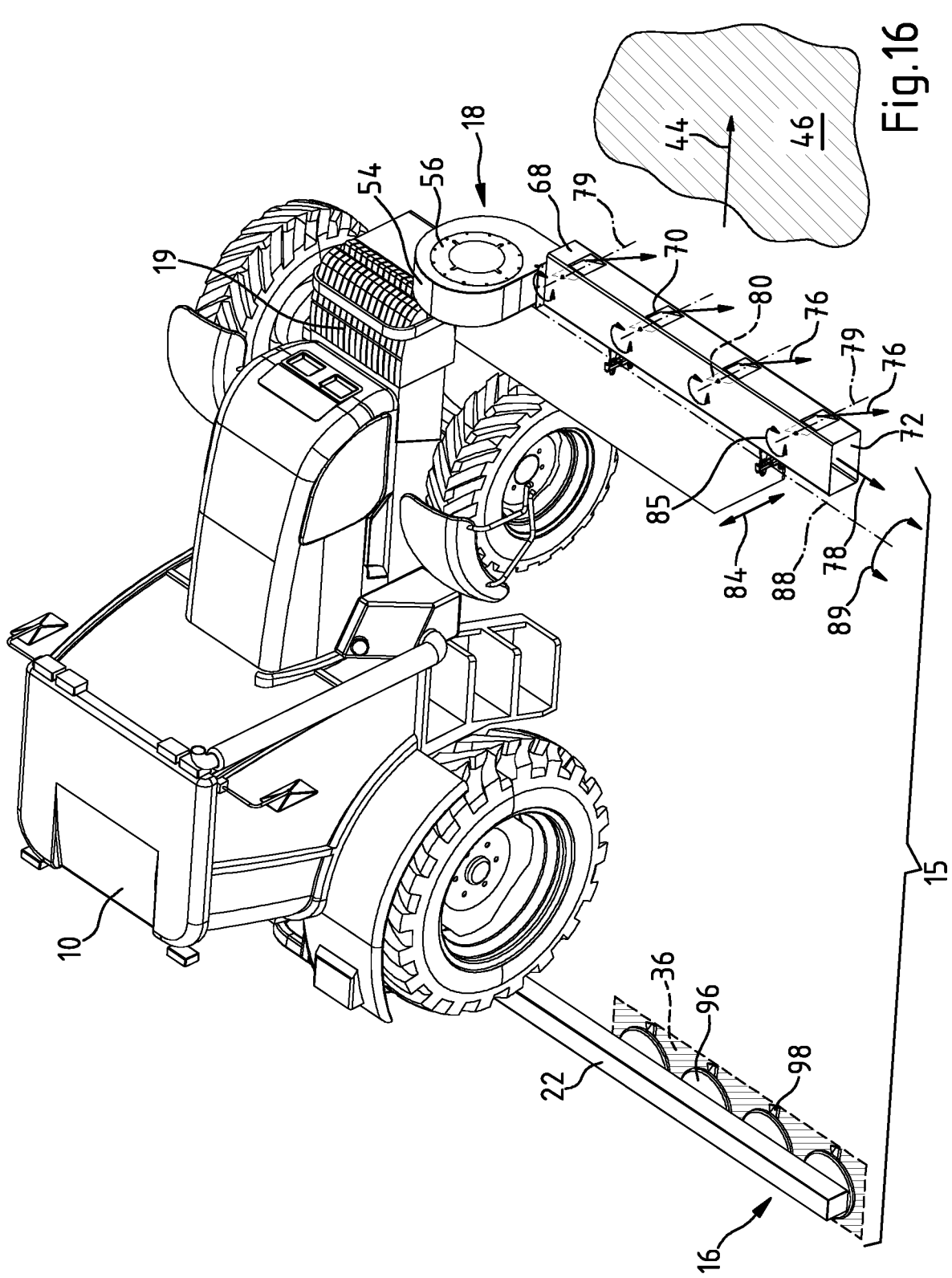
FIG. 16 is a perspective view of the working vehicle having a further arrangement of equipment which has an implement designed as a mower.

FIG. 16 shows the working vehicle 10 with an implement 16 accommodated on its rear, which is designed as a mower for harvesting coarse fodder, and with a blower 18 carried by the working vehicle 10 on its front side. Insofar as the assemblies and elements of this arrangement of equipment 15 correspond to the assemblies and elements of the arrangements of equipment described with reference to FIGS. 1 to 13, they are denoted by the same numbers as reference signs. The implement 16 contains a machine tool 22 with a plurality of rotary plates 96, to which cutting blades 98 for harvesting coarse fodder are connected. For preventing small creatures 50 from getting into the active portion 36 of the machine tool 22 during harvesting coarse fodder when the working vehicle 10 with the mower is moved through the working region 46, a blower 18 is accommodated on the front side of the working vehicle 10.

The blower 18 contains a fan as a device 54 for generating a blower air flow, which includes a fan turbine wheel 56 driven by an electric motor. In the case of the blower 18, the fan exit opening is connected directly to a blower air register 68 which has a plurality of front-side outlet openings 70 for blower air and a lateral outlet opening 72 for blower air. The blower air generated by the fan in the blower 18, which is guided in the fan from the fan exit opening to the outlet openings 70, 72, can exit therefrom in the directions indicated by the arrows 76, 78. The blower 18 can be raised and lowered relative to the frame 19 of the working vehicle 10 in the direction indicated by the double arrow 84 and pivoted about a horizontal pivot axis 88, as indicated by the double arrow 89. This measure makes it possible to adjust the directions of the blower air exiting from the outlet openings 70 in relation to the frame 19 of the working vehicle 10.

Figure 17:
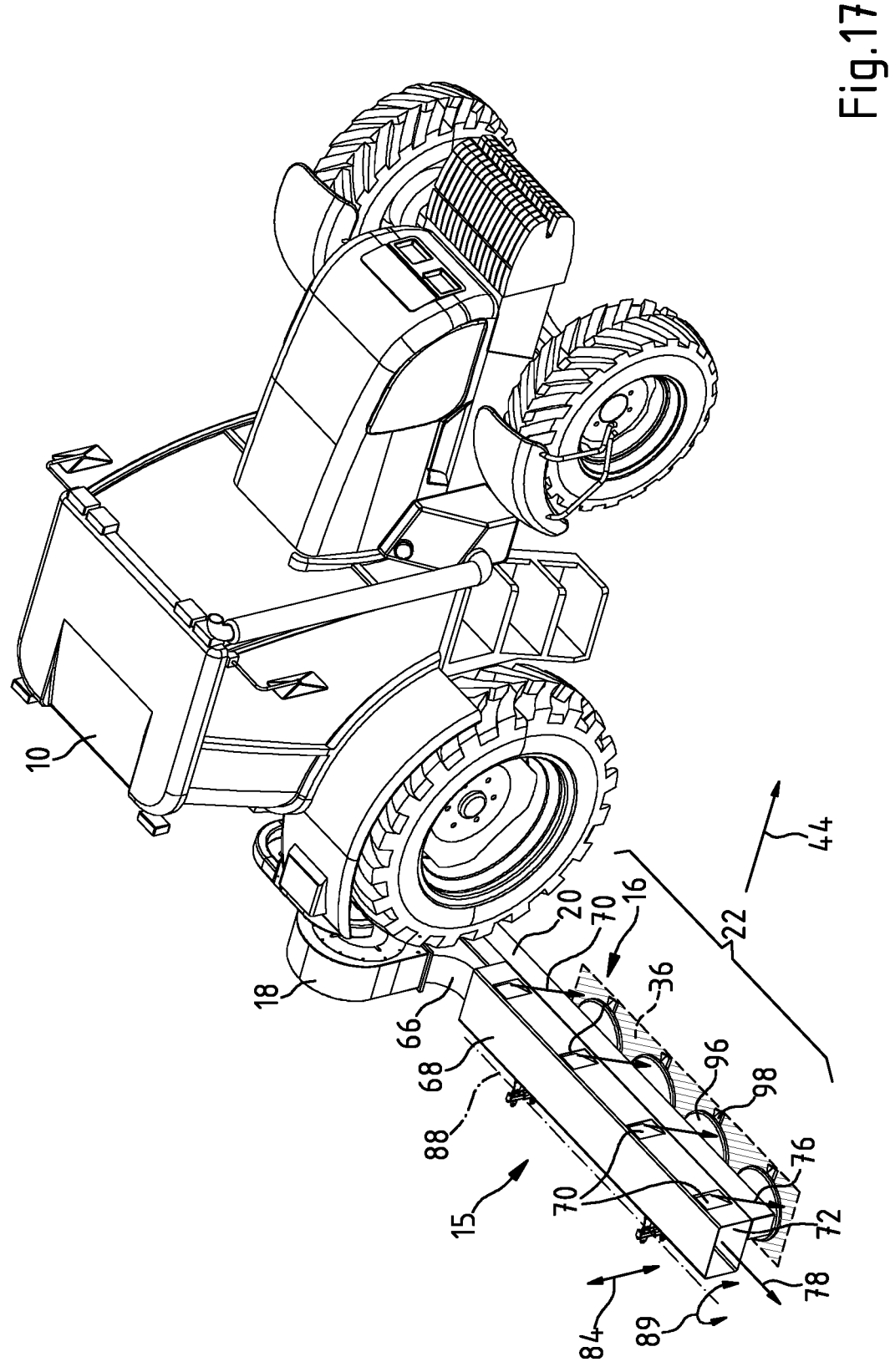
FIG. 17 is a perspective view of the working vehicle having a further arrangement of equipment which has an implement designed as a mower.

FIG. 17 shows the working vehicle 10 having a further arrangement of equipment 15 which has an implement 16 which is designed as a mower for harvesting coarse fodder and contains a blower 18. In this case, the implement 16 and the blower 18 are connected to the rear of the working vehicle 10.

Insofar as the assemblies and elements of this arrangement of equipment 15 correspond to the assemblies and elements of the arrangements of equipment described with reference to FIGS. 1 to 16, they are denoted by the same numbers as reference signs. The implement 16 contains a machine tool 22 with a plurality of rotary plates 96, to which cutting blades 98 for harvesting coarse fodder are connected. In order to prevent small creatures from getting into the active portion 36 of the machine tool 22 during harvesting coarse fodder when the working vehicle 10 with the mower is moved through the working region 46, the blower 18 contains, as a device 54 for generating a blower air flow, a fan with a fan exit opening which is connected to a pipe 66 communicating with a blowing air register 68. The blower air register 68 has a plurality of front-side outlet openings 70 for blower air and a lateral outlet opening 72 for blower air.

In this case, the blower air register 68 is arranged above the machine tool 22 and is connected to a holding frame 20 which carries the machine tool 22. The blower air generated by the fan in the blower 18, which is guided in the fan from the fan exit opening to the outlet openings 70, 72, can in this case exit therefrom in the directions indicated by the arrows 76, 78 into the portion 52 of the working region 46 of the implement 16 preceding the active portion 36 of the machine tool 22 in the working direction 44.

The blower air register 68 can be raised and lowered on the holding frame 20, which carries the machine tool 22, in the direction indicated by the double arrow 84 and pivoted about a horizontal pivot axis 88, as indicated by the double arrow 89. This measure makes it possible to adjust the directions of the blower air exiting from the outlet openings 70 in relation to the machine frame of the machine tool 22.

Figure 18:
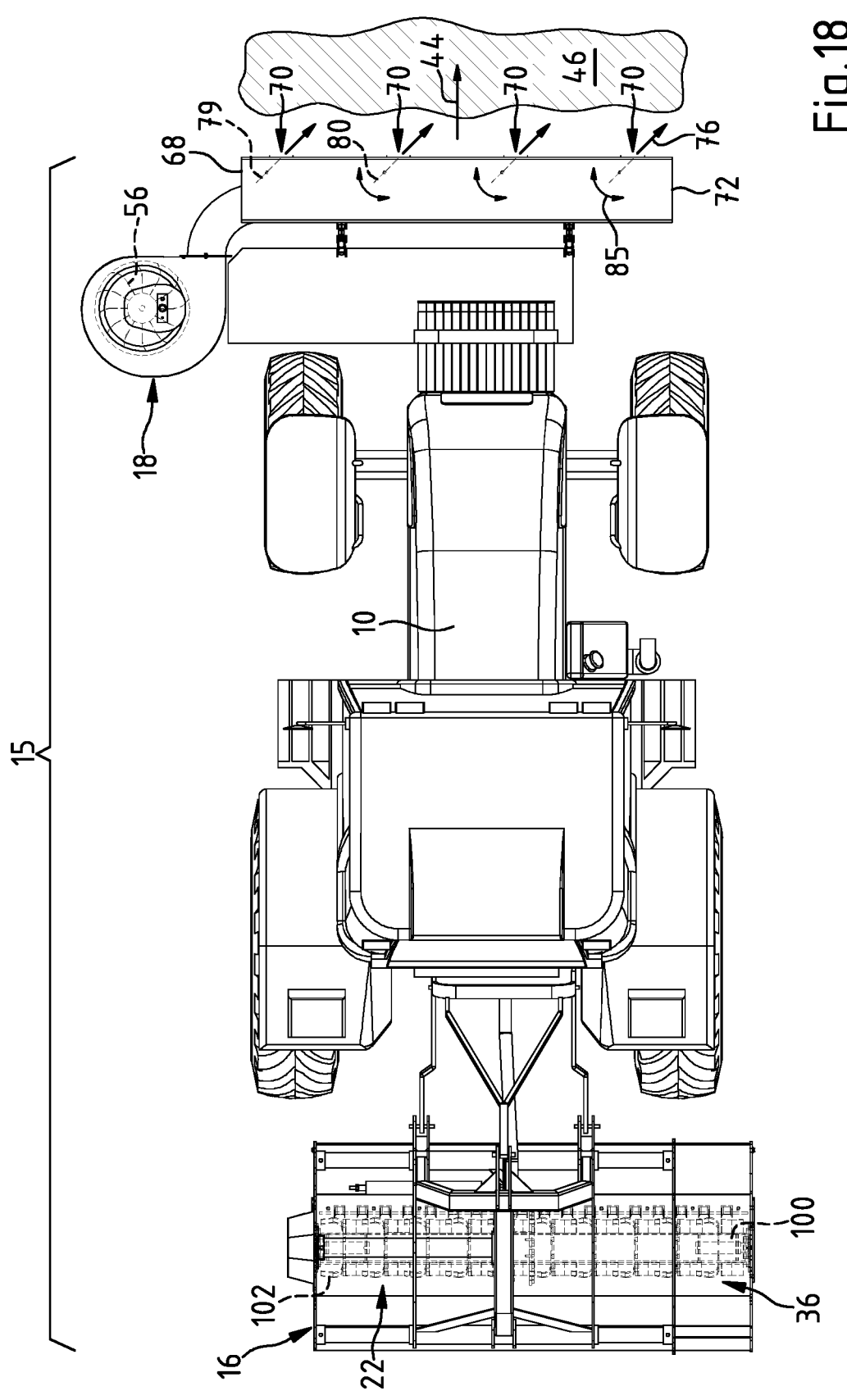
FIG. 18 is a view of the working vehicle having a further arrangement of equipment which has an implement designed as a rotary tiller.

FIG. 18 shows the working vehicle 10 having an implement 16 which is designed as a rotary tiller and mounted on its rear, and a blower 18 which the working vehicle 10 carries on its front side. Insofar as the assemblies and elements of this arrangement of equipment 15 correspond to the assemblies and elements of the arrangements of equipment described with reference to FIGS. 1 to 17, they are denoted by the same numbers as reference signs. The implement 16 contains a machine tool 22 which has a tine rotor 100 with tines 102. In order to prevent small creatures 50 from getting into the active portion 36 of the machine tool 22 during soil tillage when the working vehicle 10 is moved through the working region 46 in the working direction 44, indicated by the arrow, a blower 18 is once again accommodated on the front side of the working vehicle 10. In this case, the blower 18 contains a fan which includes a fan turbine wheel 56 driven by an electric motor. In the case of the blower 18, the fan exit opening is connected directly to a blower air register 68 which has a plurality of front-side outlet openings 70 for blower air and a lateral outlet opening 72 for blower air. The blower air generated by the fan in the blower 18 and guided in the fan from the fan exit opening to the outlet openings 70 can exit therefrom in the directions indicated by the arrows 76.

Figure 19:
FIG. 19 is a perspective view of the working vehicle having a further arrangement of equipment which has an implement designed as a mulcher.

FIG. 19 shows the working vehicle 10 having an arrangement of equipment 15 in the form of an implement 16 accommodated at the rear of the working vehicle 10 with a machine tool to which a blower 18 is connected. Insofar as the assemblies and elements of this arrangement of equipment 15 correspond to the assemblies and elements of the arrangements of equipment described with reference to FIGS. 1 to 15, they are denoted by the same numbers as reference signs. The blower 18 once again contains a fan which includes a fan turbine wheel 56 driven by an electric motor. The blower 18 has a blower air channel 74 which is guided through a pipe 66 to an outlet opening 72, through which the blower air generated by the fan can be released as a blower air flow which blows the portion 52 of the working region 46 preceding the active portion 36 in the working direction 44 of the mulcher, indicated by the arrow, free of small creatures 50 over a width corresponding to the working width of the machine tool, so that they are not harmed by the machine tool in the implement 16.

Figure 20:
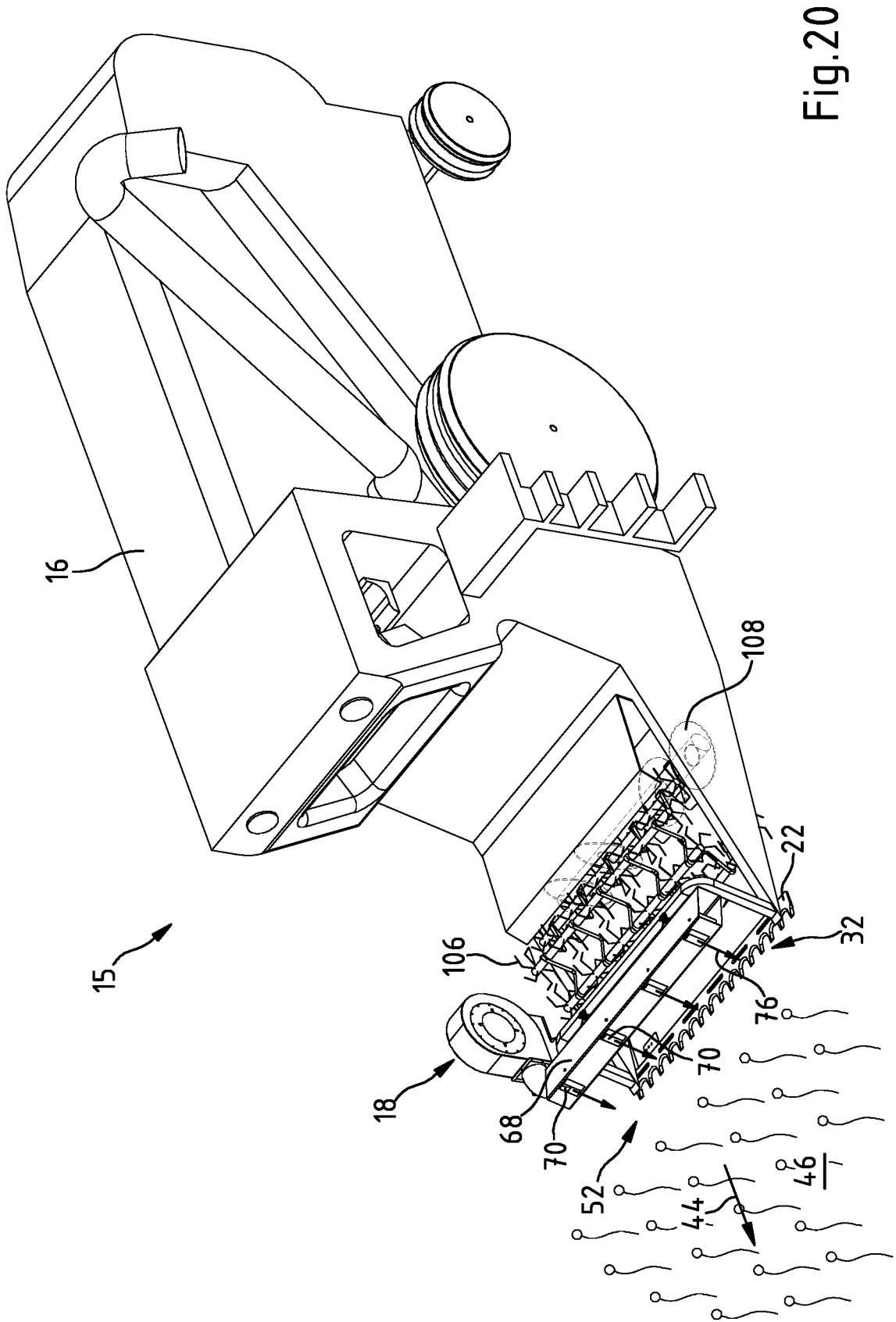
FIG. 20 is a perspective view of an arrangement of equipment with an implement designed as a combine harvester.

FIG. 20 is a perspective view of an arrangement of equipment 15 with an implement 16 designed as a combine harvester to which a blower 18 is connected. Insofar as the assemblies and elements of this arrangement of equipment 15 correspond to the assemblies and elements of the arrangements of equipment described with reference to FIGS. 1 to 16, they are denoted by the same numbers as reference signs. The combine harvester contains a machine tool 22 with a hydraulically driven cutter bar and has a reel 106 which moves plants cut from their stalks by the cutter bar into a conveyor system 108 which feeds the plants cut from their stalks by the machine tool 22 to a threshing system.

In order to prevent small creatures from being harmed by the cutter bar of the machine tool 22 when the combine harvester is moved in the working direction 44, indicated by the arrow, through a working region 46, the blower 18 with a blower air register 68 is used to generate a blower air flow in a direction corresponding to the arrows 76, which runs obliquely to the working direction and blows the portion 52 of the working region 46 preceding the active portion 36 of the machine tool 22 in the working direction free of small creatures with blower air directed transversely to the working direction 44, so that they are not harmed by the combine harvester.

Figure 21:
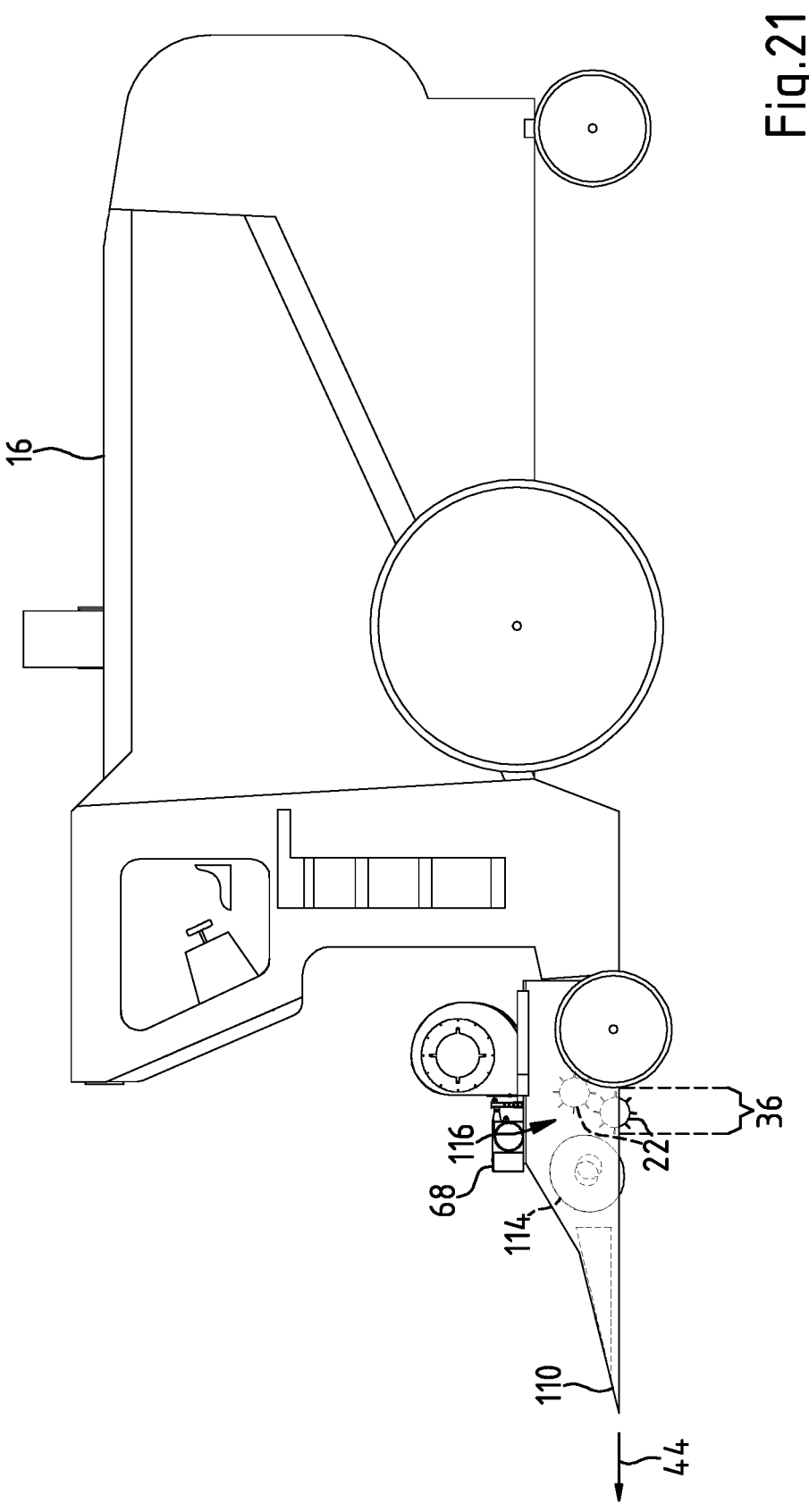
FIG. 21 is a side view of an arrangement of equipment with an implement designed as a corn chopper.
Figure 22:
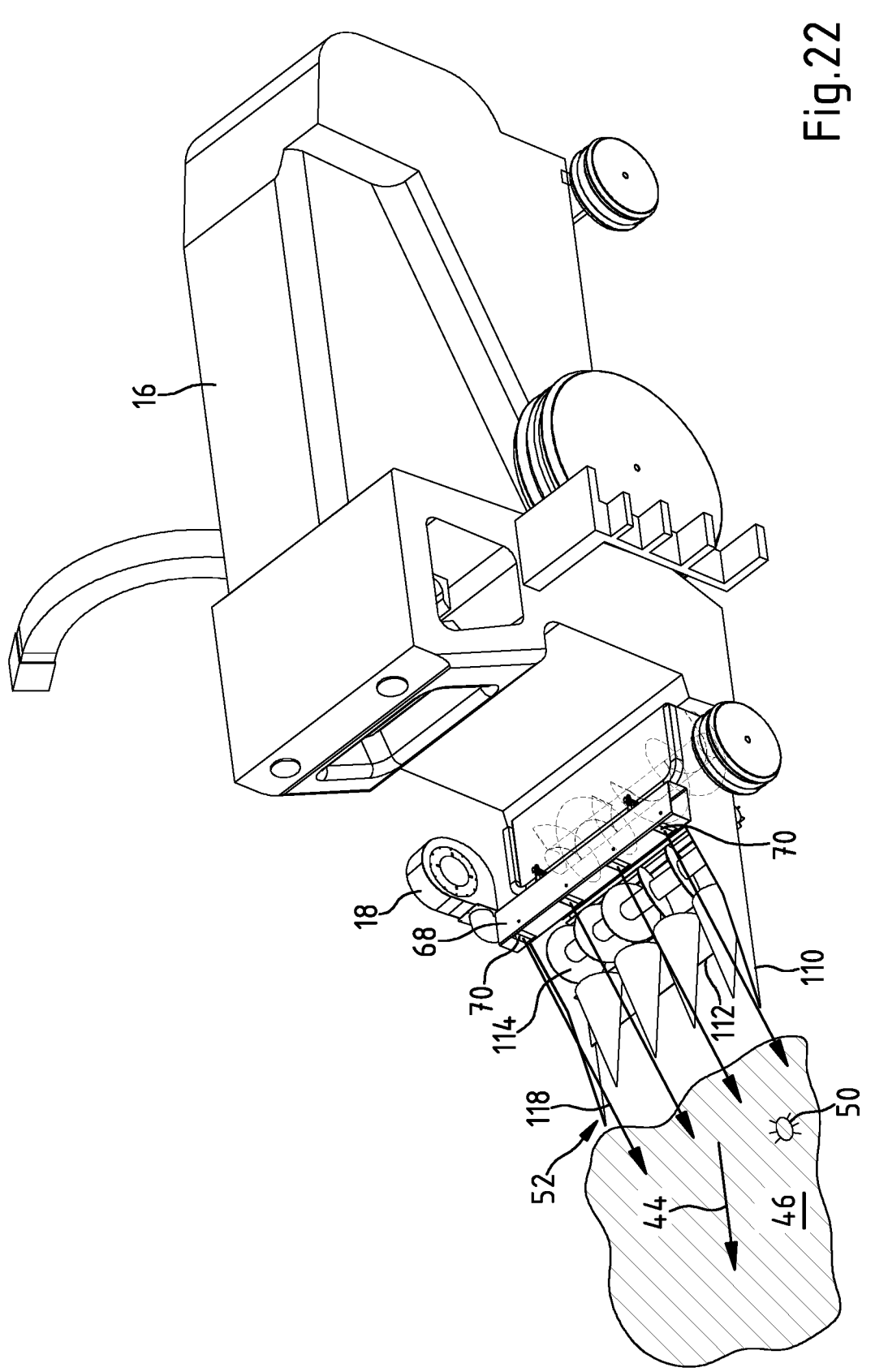
FIG. 22 is a perspective view of the arrangement of equipment with the implement designed as a corn chopper.

FIG. 21 is a further side view of an arrangement of equipment 15 with an implement 16 designed as a corn chopper which is combined with a blower 18. FIG. 22 is a perspective view of the arrangement of equipment 15. Insofar as the assemblies and elements of this arrangement of equipment 15 correspond to the assemblies and elements of the arrangements of equipment described with reference to FIGS. 1 to 20, they are denoted by the same numbers as reference signs. The corn chopper has a harvesting header 110 with a cutter bar 112 and contains a first auger system 114 which feeds plants cut by the cutter bar 112 to a chopper 116 having a machine tool 22 with chopper drums carrying cutting tools. In order to prevent small creatures from being harmed in the machine tool 22 when the corn chopper is moved in the working direction 44, indicated by the arrow, through a working region 46, a blower air flow is generated by means of the blower 18 with a blower air register 68, which blows the portion 52 of the working region 46 preceding the active portion 36 of the machine tool 22 in the working direction free of small creatures 50 by means of blower air in the direction 118 indicated by the arrows, so that they are not harmed by the combine harvester.

Figure 23:
FIG. 23 is a first arrangement of equipment for lawn mowing.

FIG. 23 shows an arrangement of equipment 15 for lawn mowing with an implement 16 which is designed as a hand-operated lawn mower. The lawn mower has an electric drive motor 120 which drives a cutting blade as a machine tool 22 by means of a drive shaft. Insofar as the assemblies and elements of this arrangement of equipment 15 correspond to the assemblies and elements of the arrangements of equipment described with reference to FIGS. 1 to 22, they are denoted by the same numbers as reference signs. The arrangement of equipment 15 has a blower 18 with a fan turbine wheel 56 which is arranged above the drive motor 120 on the side facing away from the cutting blade. A blower air channel 74, which is integrated in a housing 122 covering the cutting blade and opens into a blower air register 68 with a plurality of outlet openings 70 for blower air, generates a blower air flow via the fan turbine wheel 56 when the cutting blade rotates, which blows the portion 52 of the working region 46 preceding the active portion 36 of the machine tool 22 in the working direction 44, indicated by the arrow, free of small creatures by means of blower air flowing in the direction 118, so that they are not harmed by the machine tool 22 when mowing the lawn.

Figure 24:
FIG. 24 and FIG. 25 is a second arrangement of equipment for lawn mowing.
Figure 25:
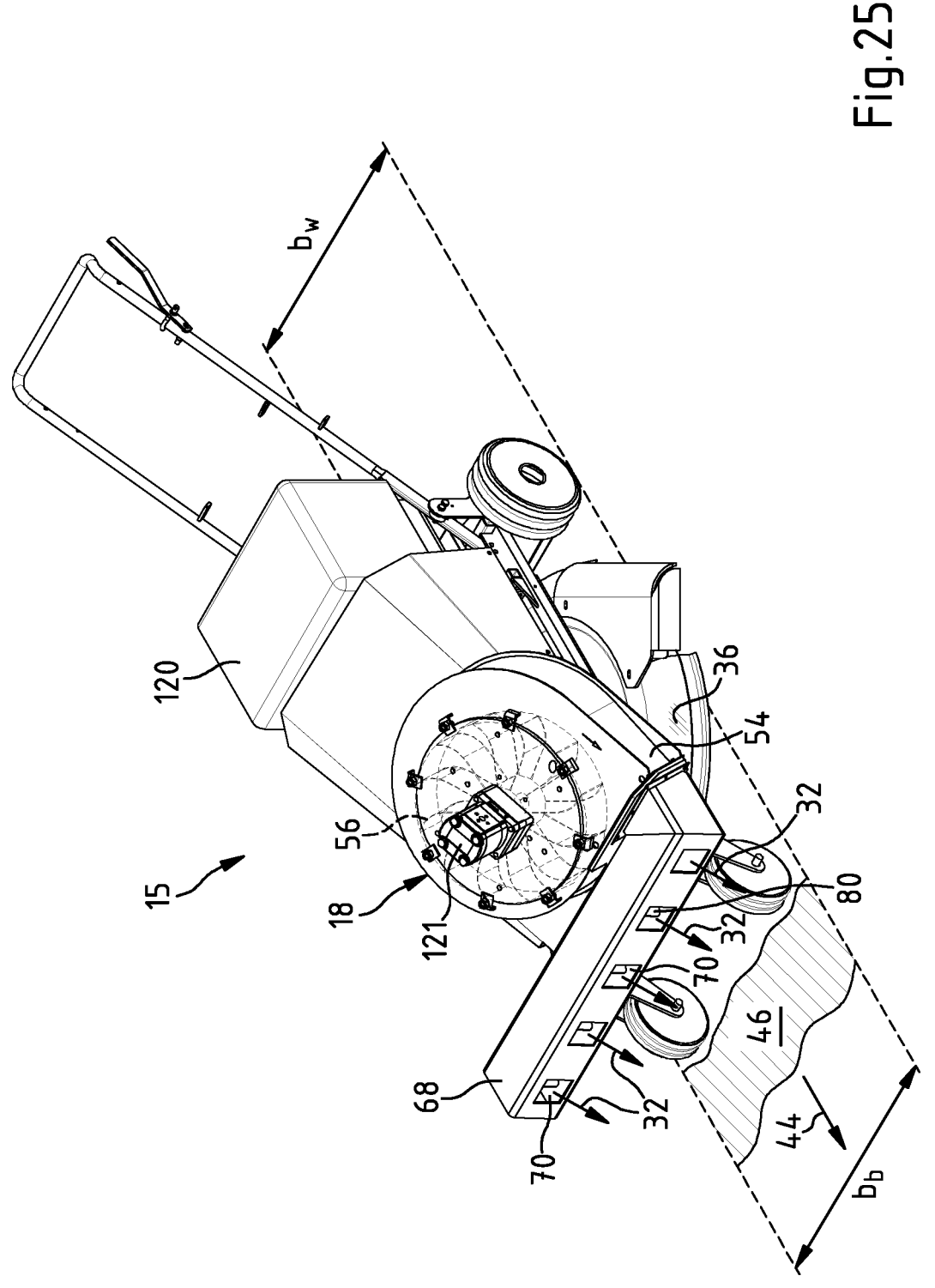

FIG. 24 and FIG. 25 show a further arrangement of equipment 15 for lawn mowing with an implement 16 which is designed as a hand-operated lawn mower. Insofar as the assemblies and elements of this arrangement of equipment 15 correspond to the assemblies and elements of the arrangements of equipment described with reference to FIGS. 1 to 23, they are denoted by the same numbers as reference signs. The arrangement of equipment 15 has a blower 18 with a device 54 designed as a fan for generating a blower air flow, which contains a fan turbine wheel 56, for the drive of which an electric drive motor 121 different from the drive motor 120 of the cutting blades is provided. In this case, the fan is connected directly to a blower air register 68. The blower air register 68 has a plurality of outlet openings 70 for blower air, which sweeps over the portion 52 of the working region 46 of the implement 16 preceding the active portion 36 of the machine tool 22 in the working direction 44 over a width $b_b$ corresponding to the working width $b_w$ of the machine tool 22 in a direction 32 running transversely to the working direction 44 in order to blow small creatures out of said portion. In this way, it is achieved that they are not harmed by the machine tool 22 when mowing the lawn.

Figure 26:
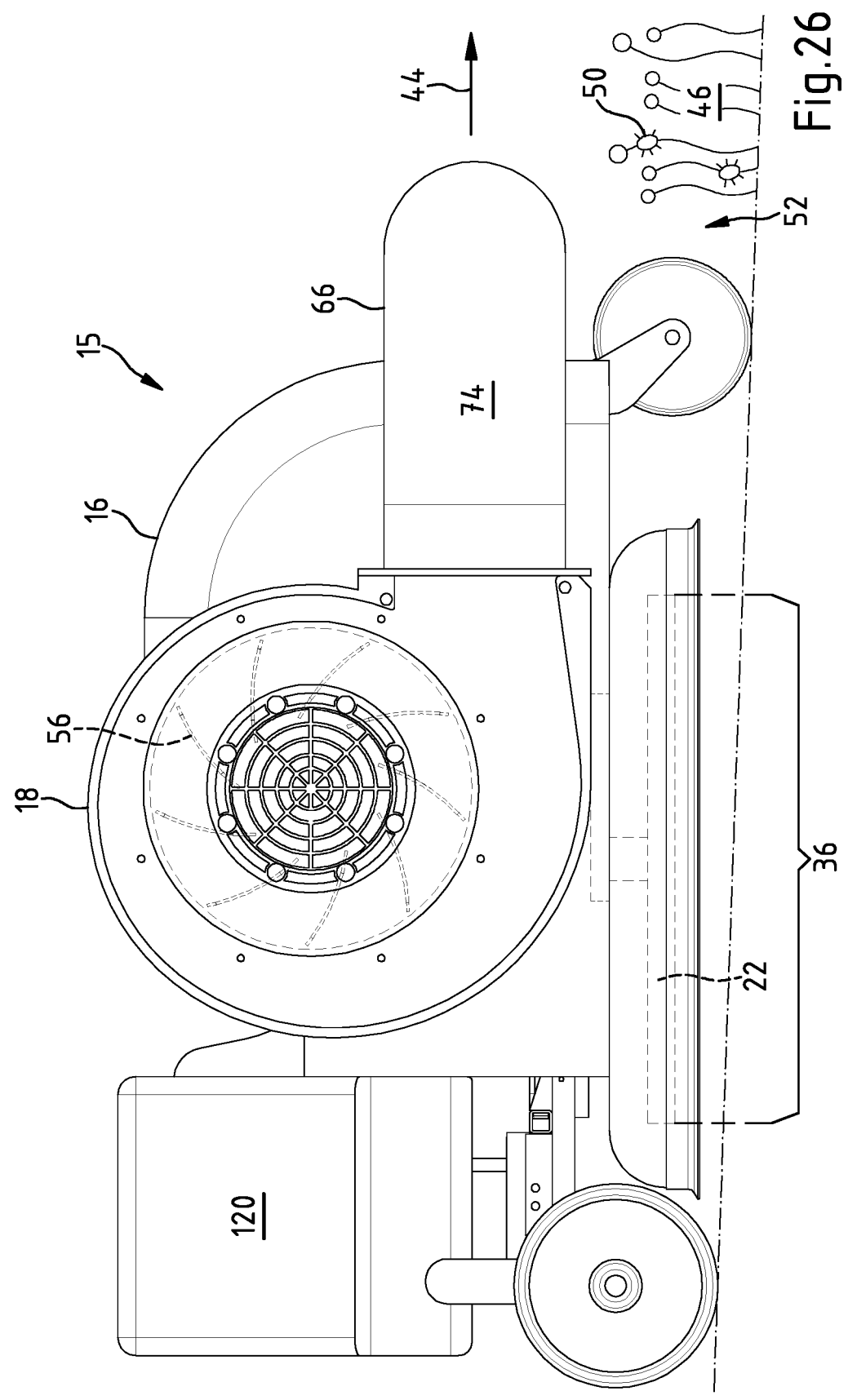
FIG. 26 and FIG. 27 is a third arrangement of implements for lawn mowing.
Figure 27:
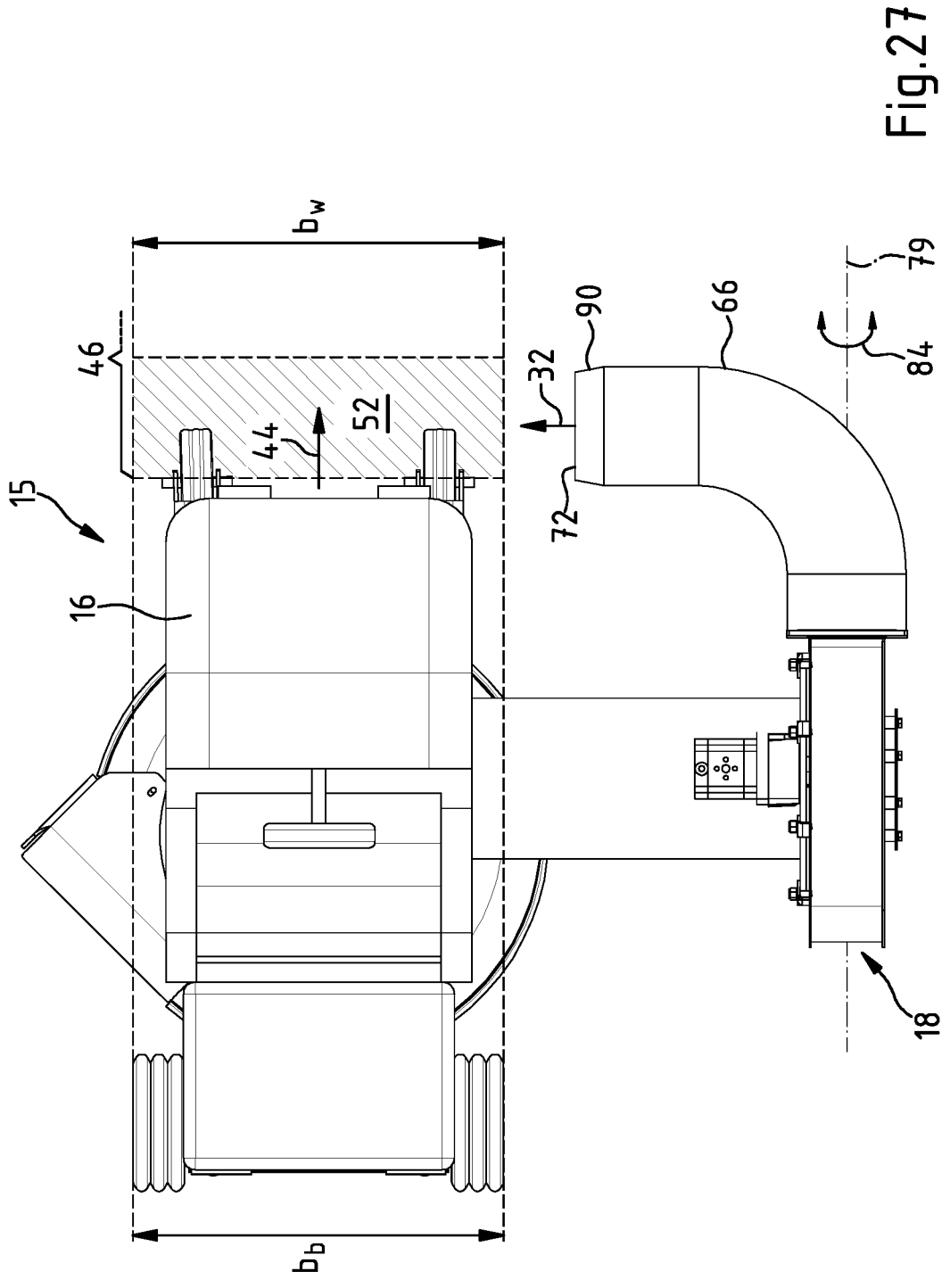

FIG. 26 is a side view of a further arrangement of equipment 15 for lawn mowing with a self-propelled implement 16 in the form of a ride-on mower which has a drive motor 120 that drives a cutting blade as a machine tool 22 by means of a drive shaft. Insofar as the assemblies and elements of this arrangement of equipment 15 correspond to the assemblies and elements of the arrangements of equipment described with reference to FIGS. 1 to 25, they are denoted by the same numbers as reference signs. FIG. 27 is a plan view of this arrangement of equipment. The arrangement of equipment 15 has a blower 18 with a fan turbine wheel 56 which is coupled to the drive shaft of the machine tool 22 via a gear. When the machine tool 22 is operated, the blower 18 generates a blower air flow which is guided through a blower air channel 74 in a pipe 66 pivotable about a pivot axis 79 according to the double arrow 84 to a nozzle 90. The blower air provided by the blower 16 thus sweeps over the portion 52 of the working region 46 of the working machine 16 preceding the active portion 36 of the machine tool 22 in the working direction 44 over a width $b_b$, which corresponds to the working width $b_w$ of the machine tool 22, in a direction 32 running transversely to the working direction 44. The blower air exiting from the pipe 66 makes it possible to blow free the portion 52 of the working region 46 preceding the active portion 36 of the machine tool 22 in the working direction 44 indicated by the arrow. Small creatures 50 are then blown out of the portion 52 of the working region 46. This prevents them from being harmed by the machine tool 22 when mowing the lawn.

Figure 28:
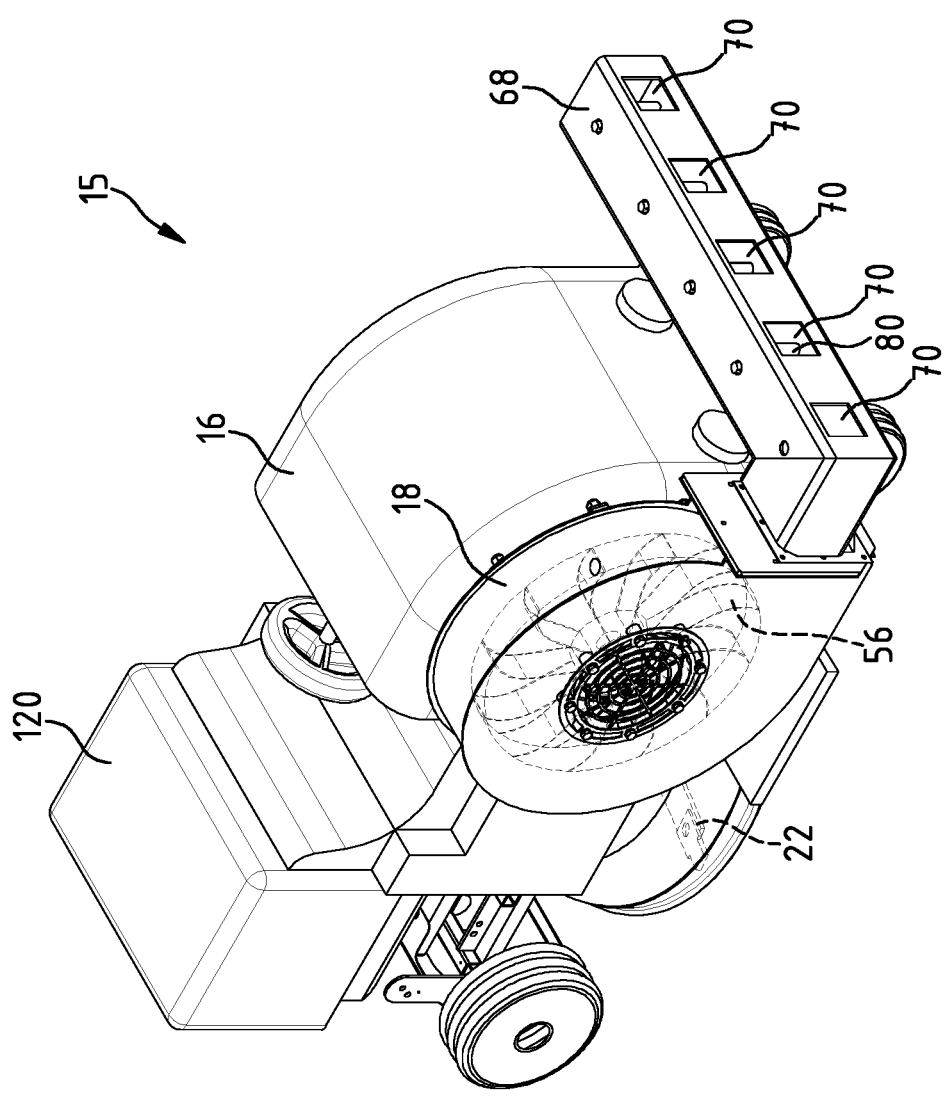
FIG. 28 and FIG. 29 is a fourth arrangement of equipment for lawn mowing.
Figure 29:
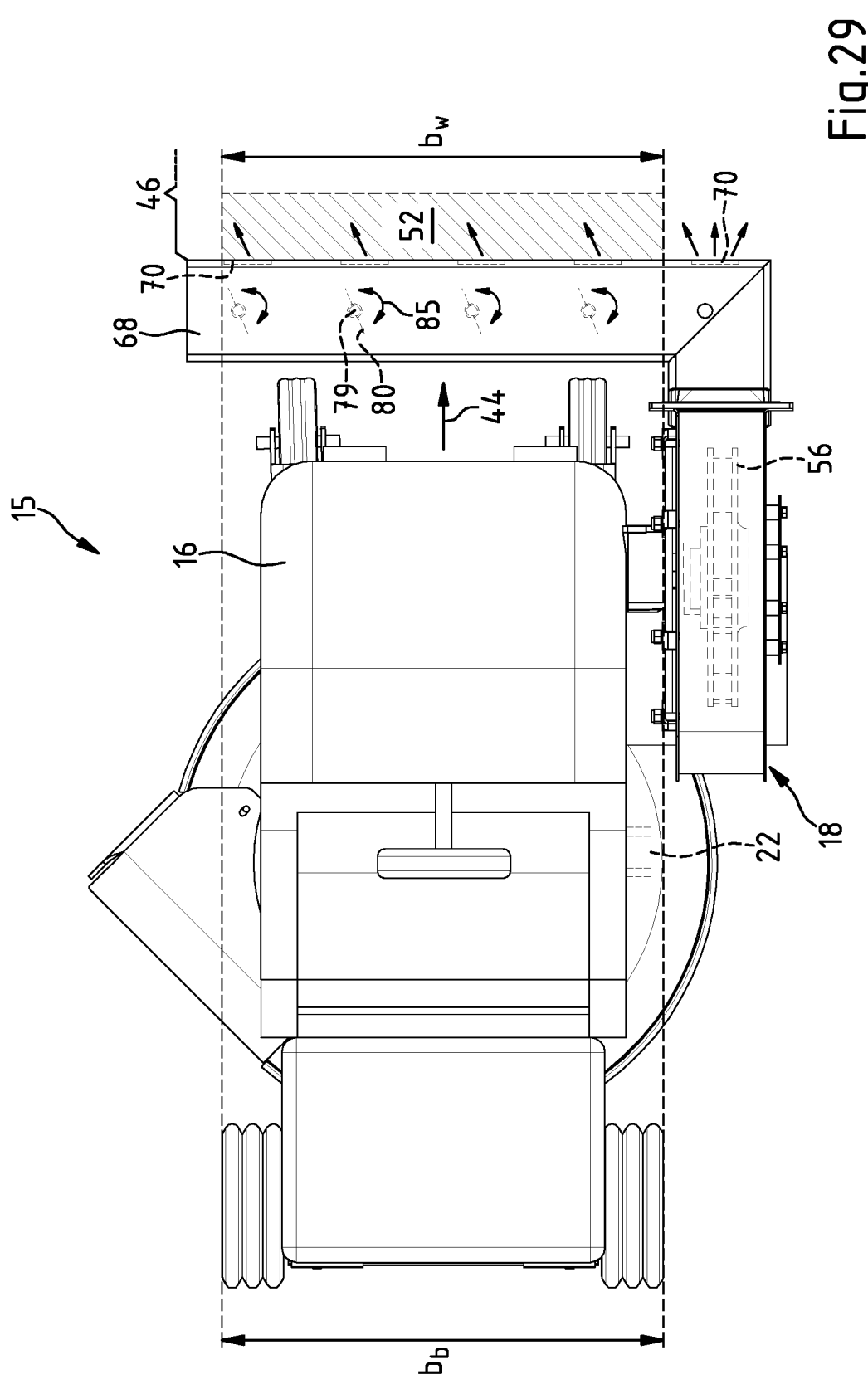

FIG. 28 shows a further arrangement of equipment 15 for lawn mowing with a self-propelled implement 16 in the form of a ride-on mower which has a drive motor 120 that drives a cutting blade as a machine tool 22 by means of a drive shaft. FIG. 29 is a plan view of this arrangement of equipment. Insofar as the assemblies and elements of this arrangement of equipment 15 correspond to the assemblies and elements of the arrangements of equipment described with reference to FIGS. 1 to 27, they are denoted by the same numbers as reference signs. The arrangement of equipment 15 also has a blower 18 with a fan turbine wheel 56 which is coupled to the drive shaft of the machine tool 22 via a gear. When the machine tool 22 is operated, the blower 18 generates a blower air flow which is guided into a blower air register 68 which has a plurality of outlet openings 70 for blower air. The blower air sweeps over the portion 52 of the working region 46 of the implement 16 preceding the active portion 36 of the machine tool 22 in the working direction 44 over a width $b_b$, which corresponds to the working width $b_w$ of the machine tool 22, in a direction running transversely to the working direction 44, in order to blow small creatures out of said portion. In this way, it is achieved that they are not harmed by the machine tool 22 when mowing the lawn.

It must be noted that the implement in an arrangement of equipment according to this disclosure can also be designed as a spraying device which contains a machine tool which sprays a liquid for pest control on plants, e.g., to make the surface of the plants unattractive or even uninhabitable for pests settled thereon. By using a blower in the arrangement of equipment to blow small creatures from the plants by generating an air flow in a portion of the working region preceding the active portion of the machine tool of the spraying device in the working direction, it is possible to prevent them from coming into contact with, and thus be harmed by, the liquid for pest control.

In summary, the following preferred features of this disclosure must in particular be noted:

An arrangement of equipment 15 contains an implement 16 which has a machine tool 22 for a working operation selected from the group comprising maintenance of green areas, mulching, mowing, soil tillage, harvesting coarse fodder, harvesting cereal crops and spraying, and which has an active portion 36 which can be moved in a working direction 44 through a working region 46. The arrangement of equipment 15 includes a blower 48 for blowing small creatures 50 out of a portion 52 of the working region 46 preceding the active portion 36 of the machine tool 22 in the working direction 44.

The blower 18 can have a blower air channel 74 for guiding a blower air flow to at least one outlet opening 70, 72 which is used for exiting blower air flowing through the portion 52 of the working region 46 preceding the active portion 36 of the machine tool 22 in the implement 16 in the working direction 44.

In particular, the blower 18 can have a device for generating a blower air flow that runs in the blower air channel 74 to the at least one outlet opening 70, 72.

The blower 18 can contain at least one guide means for guiding the blower air flow through the at least one outlet opening 70, 72 with a flow direction running transversely or obliquely to the working direction 44.

It is possible that the at least one guide means for guiding the blower air flow through the at least one outlet opening 70, 72 comprises a nozzle 90 and/or that the at least one guide means for guiding the blower air flow through the at least one outlet opening 70, 72 has a guide plate 80 arranged in the blower air channel 74.

The at least one guide means can be adjustable.

The arrangement of equipment can have a holding frame 20 on which a deflection gear 38 is fixed, which has an interface 14 for connecting a cardan shaft to be connected to a cardan shaft drive of a working vehicle 10, which has a first output rotationally coupled to a first gear for driving the machine tool 22 in the implement 16, and which has a second output with a second gear for driving the device for generating a blower air flow in the blower air channel 74 of the blower 18.

The arrangement of equipment can contain an electric motor 120 or a hydraulic motor 93 for driving the device for generating a blower air flow in the blower air channel 74 of the blower.

The blower air channel 74 of the blower 18 in the arrangement of equipment can communicate through a blower air line with a blower air register 68 which has a plurality of outlet openings 70, 72 for the exit of blower air flowing through the portion 52 of the working region 46 preceding the active portion 36 of the machine tool 22 in the implement 16 in the working direction 44.

The blower air register 68 can be pivoted about a pivot axis 88 relative to the implement 16 in order to adjust the direction of the blower air exiting from the at least one outlet opening 70, 72.

The implement 16 can be an implement selected from the group comprising combine harvester, corn chopper, mulcher, mower, or rotary tiller.

The blower 18 can be fixed to a holding frame 20 for holding the machine tool 22 in the implement 16.

A working vehicle 10 can have an arrangement of equipment 15 as described above for moving the active portion 36 of the machine tool 22 of the implement 16 through the working region 46 in the working direction 44.

The working vehicle 10 can contain a working vehicle frame 19 on which the blower 18 is accommodated at the front side and the implement 16 is accommodated at the rear side in relation to the working direction 44.

In a method for carrying out a working operation selected from the group comprising maintenance of green areas, mowing, mulching, soil tillage, harvesting coarse fodder, harvesting cereal crops and spraying, a machine tool 22, which has an active portion 36, is moved in a working direction 44 through a working region 46, wherein small creatures 50 are blown out of a portion 52 of the working region 46 preceding the active portion 36 of the machine tool 22 in the working direction 44 by means of a gaseous fluid flow.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

10 Working vehicle
12 Front linkage
14 Interface
15 Arrangement of equipment
16 Implement
17 Working plane
18 Blower
19 Working vehicle frame
20 Holding frame
22 Machine tool
24 Rotor shaft
26 Tool
28 Rotor shaft carrier
30 Rotor shaft axis 32 Direction
34 Pivot axis
36 Active portion
38 Deflection gear
40 Power take-off shaft
42 Drive shaft
44 Working direction
46 Working region
48 Blower
50 Small creatures
52 Portion
54 Device for generating a blower air flow
56 Fan turbine wheel
58 Turbine blade
60 Step-up gear
62 Suction opening
63 Fan exit opening
64 Arrow
66 Pipe
68 Blower air register
70, 72 Outlet opening
73 Nozzle body
74 Blower air channel
75 Ball joint
77 Pivot joint
76, 78 Arrow
79 Pivot axis
80 Guide plate
81 Flow guide body
82 Linear guide
84, 85, 89 Double arrow
86 Pivot joint
88 Pivot axis
90, 91 Nozzle
92 Protective cover
93 Hydraulic motor
94 Boom arm
95 Boom arm base
96 Rotary plate
97 Flow direction
98 Cutting blade
99, 101 Side
100 Tine rotor
102 Tines
106 Reel
108 Conveyor system
110 Harvesting header
112 Cutter bar
114 First auger system
116 Chopper 118 Direction
120, 121 Electric drive motor
122 Housing

What is claimed is:

1. An arrangement of equipment, comprising:
an implement having a machine tool configured for a working operation including maintenance of green areas, mulching, mowing, soil tillage, harvesting coarse fodder, harvesting cereal crops and/or spraying, the machine tool having an active portion movable in a working direction through a working region; and
a blower configured for providing blower air in a blowing area of the working region, the blowing area being located ahead of the active portion of the machine tool in the working direction;
wherein the blower includes a fan with a housing which has a suction opening for suctioning the blower air and which has a fan exit opening connected directly with a blower air register with a plurality of outlet openings from which the blower air is configured to flow into the blowing area.

2. The arrangement of equipment according to claim 1, wherein the blower is configured to provide the blower air through different ones of the outlet openings with mean flow directions, which, proceeding from a side of the implement facing, or facing away from, a working vehicle, enclose an angle with the working direction, which increases with increasing distance of the outlet openings from the side facing, or facing away from, the working vehicle.

3. An arrangement of equipment, comprising:
an implement having a machine tool configured for a working operation including maintenance of green areas, mulching, mowing, soil tillage, harvesting coarse fodder, harvesting cereal crops and/or spraying, the machine tool having an active portion movable in a working direction through a working region; and
a blower configured for providing blower air in a blowing area of the working region, the blowing area being located ahead of the active portion of the machine tool in the working direction;
wherein the blower is configured to provide the blower air for blowing away small creatures through different outlet openings with mean flow directions, which, proceeding from a side of the implement facing, or facing away from, a working vehicle, enclose an angle with the working direction, which increases with increasing distance of the outlet openings from the side facing, or facing away from, the working vehicle.

* * * * *